US011455105B2

(12) United States Patent
Ogawa et al.

(10) Patent No.: US 11,455,105 B2
(45) Date of Patent: Sep. 27, 2022

(54) STORAGE SYSTEM AND DATA MANAGEMENT METHOD OF SWITCHING ACCESS AUTHORITY

(71) Applicant: Hitachi, Ltd., Tokyo (JP)

(72) Inventors: Shugo Ogawa, Tokyo (JP); Kazuki Matsugami, Tokyo (JP); Ryosuke Tatsumi, Tokyo (JP); Akira Yamamoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/194,579

(22) Filed: Mar. 8, 2021

(65) Prior Publication Data

US 2022/0066664 A1 Mar. 3, 2022

(30) Foreign Application Priority Data

Aug. 25, 2020 (JP) .............................. JP2020-141524

(51) Int. Cl.
*G06F 3/06* (2006.01)

(52) U.S. Cl.
CPC .......... *G06F 3/0631* (2013.01); *G06F 3/0622* (2013.01); *G06F 3/0647* (2013.01); *G06F 3/0652* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 2009/0300082 A1* | 12/2009 | Chen | G06F 12/023 |
| 2011/0167232 A1* | 7/2011 | Takada | G06F 3/0658 |
| | | | 711/170 |
| 2015/0127854 A1 | 5/2015 | Yamamoto et al. | |
| 2015/0234618 A1* | 8/2015 | Miwa | G06F 3/0608 |
| | | | 711/165 |
| 2020/0319918 A1* | 10/2020 | Phoenix | G06F 9/54 |

FOREIGN PATENT DOCUMENTS

WO 2014/147657 A1 9/2014

* cited by examiner

*Primary Examiner* — Tracy C Chan
(74) *Attorney, Agent, or Firm* — Mattingly & Malur, PC

(57) ABSTRACT

Each controller moves authority for access processing to data in a logical area allocated to the controller between the controllers, for a first storage area in which there is data related to the logical areas of the plurality of controllers by moving the authority for the access processing from a first controller to a second controller. Each of the first controller and the second controller writes data after update related to a write request to the storage area allocated to the own controller and deletes data before update in the first storage area, and moves data for which the own controller has the authority for the access processing in the first storage area to another storage area allocated to the own controller while taking over the allocation of the first storage area in relocation processing of relocating data.

10 Claims, 23 Drawing Sheets

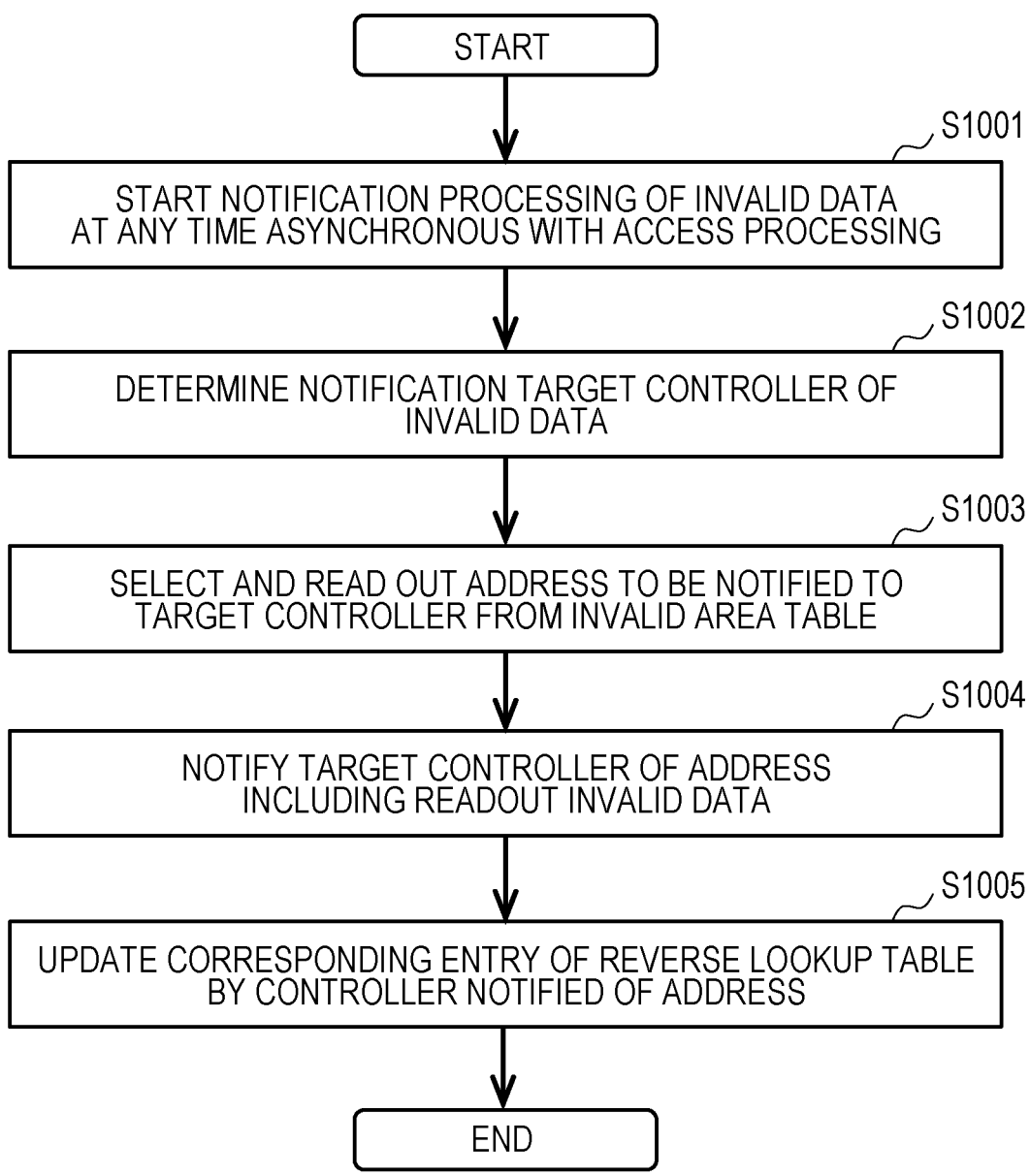

STORAGE SYSTEM AND DATA MANAGEMENT METHOD OF SWITCHING ACCESS AUTHORITY

CROSS-REFERENCE TO RELATED APPLICATION

The present application claims priority from Japanese application JP 2020-141524, filed on Aug. 25, 2020, the contents of which is hereby incorporated by reference into this application.

BACKGROUND OF THE INVENTION

1. Field of the Invention

The present invention generally relates to communication between controllers.

2. Description of the Related Art

In a storage system that requires processing performance for access to data, performance can be improved by distributing processing to a plurality of controllers. In such a storage system, it is necessary to equalize a load in order to prevent deterioration in the performance due to load concentration on a specific controller and to utilize controller resources to the maximum. In order to prevent an increase in communication overhead in access processing, it is necessary to eliminate processing dependence between the controllers as much as possible and complete the access processing inside each controller.

Thus, in a storage system having a plurality of controllers, first, it is necessary to allocate access processing to each controller such that loads of the controllers are equalized in units (hereinafter, collectively referred to as LUs) in which the access processing is independently performed as in, for example, logical units (LUs). Since the LU is recognized as a device and a storage area independent of a host that is an access source, the access processing can be executed independently for the LUs. In other words, the controller that executes the access processing of each LU is fixed to one, it is possible to avoid an overhead due to communication between the controllers.

In addition to the access processing of the LU, it is also necessary to separate the storage area managed by each controller (writing data and relocating data). In particular, in a storage system in which data is dynamically arranged like a log structure, the communication between the controllers occurs due to exclusive control when data is stored in a shared storage area from the plurality of controllers. Thus, the storage area in which writing is performed by each controller is separated, and thus, it is possible to dynamically arrange data without performing the exclusive control between the controllers.

In this regard, WO2014/147657A discloses a method of avoiding deterioration in the performance due to the communication between the controllers by performing allocation of the storage area to be managed and used by each controller to the storage area capable of being shared by the plurality of controllers constituting a storage and avoiding the sharing of the storage area from the plurality of controllers such that the controller that accesses each unit of the storage area is a single controller. WO2014/147657A discloses a method of allocating processing to an added controller of the storage by management of each controller, change of the allocation of the storage area to be used, and movement of the access processing of the LU between the controllers in the storage including the plurality of controllers.

SUMMARY OF THE INVENTION

In a storage system in which an access load fluctuates, the allocation of the access processing changes according to the fluctuation in the access load in order to maintain a state in which the loads between the controllers are equalized. When the access processing is allocated in units of LUs, the low-load controller needs to take over the access processing of the LU from the high-load controller. At this time, even after the access processing of the LU moves, it is necessary to minimize the communication overhead by maintaining a state in which the processing dependence between the controllers in the access processing of the LU and the storage area management is eliminated as much as possible.

On the other hand, when the access processing of the LU moves between the controllers, the processing dependence between the controllers occurs due to the separation between the controller that performs the access processing of the LU and the controller that manages the storage area. In order to resolve this dependence, it is necessary to move authority for the storage area management used by the LU between the controllers.

However, when the data of the LU for which the controller of a movement source performs the access processing is mixed in the storage area, it is difficult to move the authority for the storage area management. For example, in storage area management using a log structure for the purpose of preventing deterioration in performance of a solid state drive (SSD) used as a storage medium and random Write that causes lifespan consumption, it is necessary to aggregate and continuously store Write data for each LU in the identical storage area. When the storage system has a deduplication function, deduplication of data between the LUs is required in order to enhance an effect of data reduction and improve capacity efficiency. At this time, in order for the plurality of LUs to share data, it is necessary to refer to the identical storage area. Thus, the processing dependence between the controllers occurs due to the movement of the access processing of the LU.

That is, in the storage system in which the plurality of controllers shares the storage area, data of the plurality of LUs are stored in a mixed state for each part which is a unit of management and allocation in the shared storage area, and thus, the processing dependence between the controllers occurs due to the movement of the access processing of the LU. Accordingly, there is a problem that a lot of communication is required. In the storage area management in which data is dynamically arranged like the log structure, communication and exclusive control between the controllers occur due to determination and change of data arrangement in the access processing of the LU, and thus, the deterioration in the performance is caused. The controller that manages the storage area needs to relocate the stored data by performing garbage collection and defragmentation (hereinafter, these are collectively referred to as GC). Along with this relocation, the notification and exclusive control from the controller that manages the storage area for the controller that performs the access processing of the LU of data arrangement information after the relocation occur, and thus, the deterioration in the performance is caused.

In this regard, WO2014/147657A assumes that the data of each LU is stored separately in different storage areas, and does not consider the movement of the access processing of the LUs that share the storage area. That is, WO2014/147657A does not disclose a method of moving the access processing of the LU between the controllers when the storage area management or data deduplication by the log structure is performed in the storage.

The present invention has been made in consideration of the above points, and an object of the present invention is to propose a storage system or the like that can eliminate processing dependence between controllers as much as possible.

In order to solve such a problem, the present invention provides a storage system that includes one or more storage media and a plurality of controllers that provides a storage function to a host and in which the plurality of controllers shares a storage area of the storage medium. The storage area in which data is written and data is relocated is allocated to each controller. Each controller moves authority for access processing to data in a logical area allocated to the controller between the controllers. For a first storage area in which there is data related to the logical areas of the plurality of controllers by moving the authority for the access processing from a first controller to a second controller, each of the first controller and the second controller writes data after update related to a Write request to the storage area allocated to an own controller and deletes data before update in the first storage area, and moves data for which the own controller has the authority for the access processing in the first storage area to another storage area allocated to the own controller while taking over the allocation of the first storage area in relocation processing of relocating data.

In the above configuration, the data for which the own controller has the authority for the access processing in the first storage area is moved to another storage area allocated to the own controller while taking over the allocation of the first storage area. Thus, in the movement of the authority for the access processing between the controllers, it is possible to reduce the processing dependence between the controllers even when the data as the target of each access processing is mixed in the storage area. As a result, it is possible to improve performance by adding a controller in the storage system and improve usage efficiency of controller resources.

According to the present invention, communication between the controllers can be appropriately performed. Other objects, configurations, and effects will be made apparent in the descriptions of the following embodiments.

BRIEF DESCRIPTION OF THE DRAWINGS

FIG. 10 is a diagram illustrating an example of a flowchart according to the first embodiment;

Figure 1:
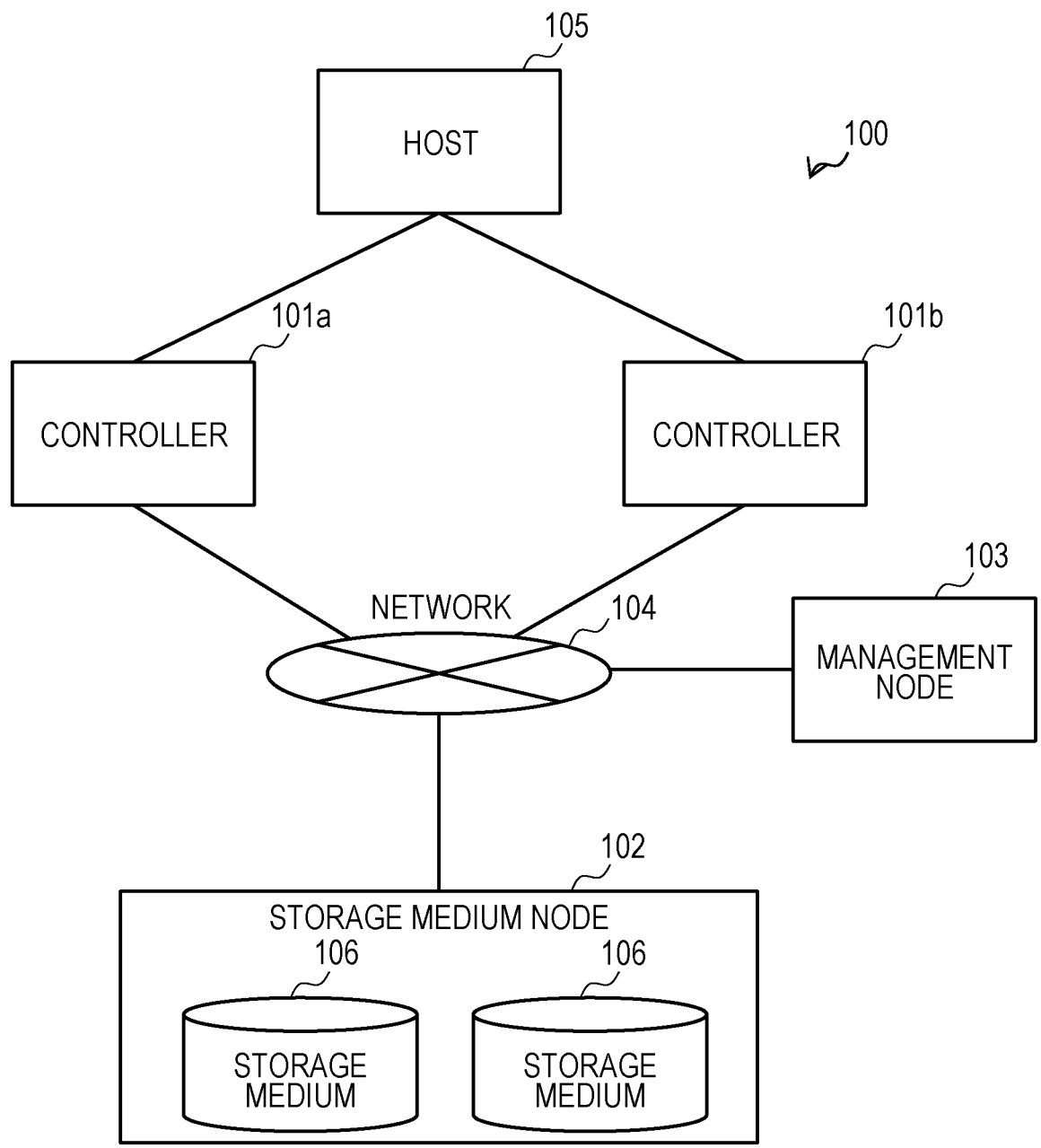
FIG. 1 is a diagram illustrating an example of a configuration related to a storage system according to a first embodiment.

DESCRIPTION OF THE PREFERRED EMBODIMENTS (1) First Embodiment

Hereinafter, one embodiment of the present invention will be described in detail. In the present embodiment, a method for moving access processing of a storage function and storage area management between controllers and performing distributed processing will be described. The present embodiment does not limit the scope of claims in the present invention, and not all of elements described in the embodiment are necessary for solving the problem in the present invention.

In a storage system according to the present embodiment, in an environment in which a plurality of controllers shares a storage area, the distributed processing is performed while moving authority for the access processing and authority for the storage area management between the controllers.

More specifically, the storage system allocates usable storage areas (storage areas to be managed) to the controllers that share the storage area in advance. First, in moving the controller that performs the access processing of the LU, mapping information between each data included in the LU and an address indicating a storage destination in the storage area is copied to and taken over by the controller as a movement destination. In response to a Read request from a host, the controller as the movement destination of the LU directly reads out data stored in the storage area managed by the controller as a movement source while referring to the taken-over mapping information. The controller as the movement destination of the LU determines the storage destination from the storage area managed by the controller (own controller) as the movement destination that is executing the access processing for data for which a Write request is issued by the host, stores the data, and updates the LU mapping information. The controller as the movement destination of the LU can hide influence of an overhead of communication by invalidating data before update that is not needed due to the storage of new data asynchronously with the processing of the Write request even though data to be invalidated is stored in the storage area managed by the controller as the movement source of the LU.

When GC processing of the managed storage area is performed, each controller extracts data included in the LU in which the controller itself that performs the GC processing is in charge of the access processing from the data stored in the storage area as a target of the GC processing, moves and relocates the extracted data in the storage area managed by the controller itself, and updates the mapping information of the LU. At this time, since the mapping information to be updated is present in the identical controller, neither communication between the controllers nor exclusive control occurs. The controller that performs the GC processing selects one from the controllers that perform the access processing of the LU including the data remaining in the storage area as the target of the GC processing, and takes over the GC processing together with the authority for the storage area management to the selected controller. The controller that takes over the GC processing of the storage area performs the processing in the same manner as the original controller. The takeover is performed between the controllers until the data on which the GC processing is to be performed is exhausted. For the controllers of which the number of usable storage areas decreases due to the takeover of the storage area during the GC processing, a new unallocated storage area is allocated from the shared storage area, and thus, the insufficiency of an available capacity is avoided.

Hereinafter, the embodiment of the present invention will be described with reference to the drawings.

In the following description, the identical elements will be assigned the same numbers in the drawings, and the description will be omitted as appropriate. A common part of reference signs excluding branch numbers may be used when the same kind of elements are described without being distinguished, and reference signs including the branch numbers may be used when the same kind of elements are described by being distinguished. For example, when the controllers are described without any distinction, the controllers may be described as "controller 101", and when the individual controllers are described separately, the controllers may be described as "controller 101a" and "controller 101b".

In FIG. 1, a reference sign 100 indicates a storage system according to the first embodiment as a whole.

FIG. 1 is a diagram illustrating an example of a configuration related to the storage system 100.

The storage system 100 includes controllers 101a and 101b (controller nodes), a storage medium node 102, a management node 103, and a network 104. The network 104 connects the controllers 101a and 101b, the storage medium node 102, and the management node 103. The controllers 101a and 101b are connected to a host 105.

The controllers 101a and 101b provide access to the storage area to host 105. The storage area is provided to the host 105 in the form of, for example, the LU mapped to the storage area. The controllers 101a and 101b may provide a plurality of LUs to the host 105. Access to each LU is provided by the single controller 101.

The storage medium node 102 includes a storage medium 106 which is a mapping destination of the storage area of the LU, and provides access to the controllers 101a and 101b. The controllers 101a and 101b share the storage medium 106 of the storage medium node 102, and any controller 101 can directly access the storage medium 106 without passing through the other controller 101.

The management node 103 manages the controller 101 that performs the access processing of each LU provided by the storage system 100 and an allocation status of each storage area constituted by the storage medium 106 connected to the storage medium node 102 to the controller 101.

The network 104 connects the controllers 101a and 101b, the storage medium node 102, and the management node 103 to each other. The network 104 communicates with the controllers 101a and 101b. For example, the network 104 transfers an access request from the controllers 101a and 101b to the storage medium 106 of the storage medium node 102 and data corresponding to the access request (hereinafter, referred to as access request data). The access request data is Read data corresponding to the Read request or Write data corresponding to the Write request.

The host 105 issues the access request to the LUs provided by the controllers 101a and 101b.

In addition to the controllers 101a and 101b, an additional controller 101 may be connected to the network 104, and the controllers 101 may share the storage medium 106 of the storage medium node 102. The storage medium node 102 may simultaneously provide access to a plurality of storage media 106. The network 104 is not limited to the configuration illustrated in FIG. 1, and, for example, a configuration in which the host 105 is connected to the network 104 and issues an access request to the controllers 101a and 101b may be used. Any of the controllers 101a and 101b or the storage medium node 102 may also serve as the management node 103.

Figure 2:
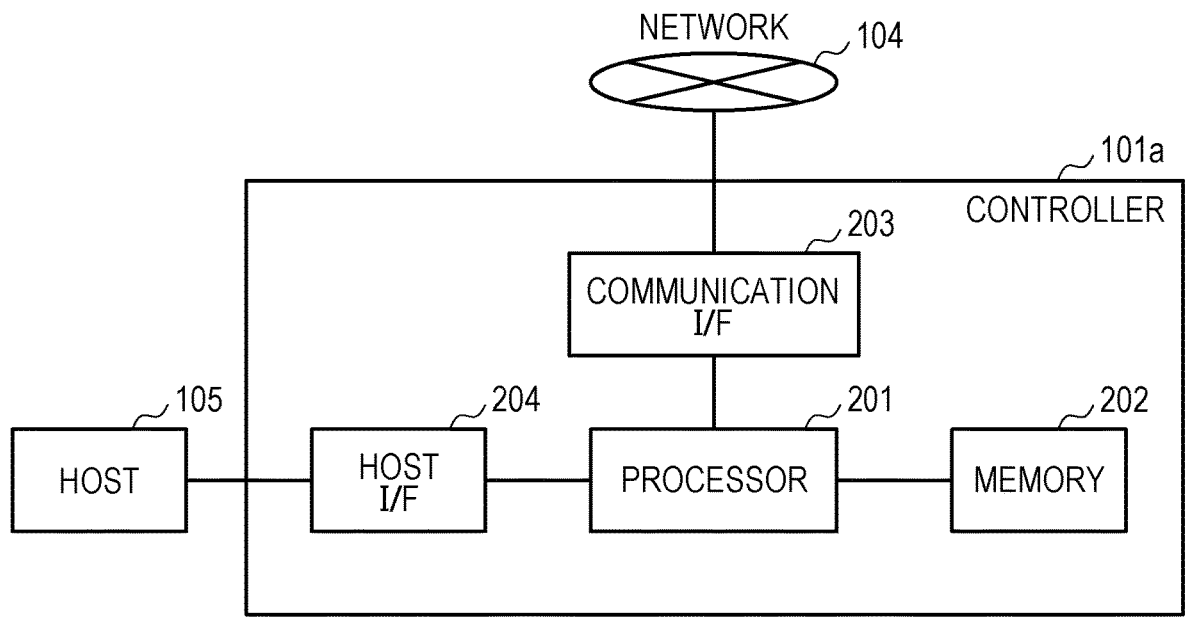
FIG. 2 is a diagram illustrating an example of a configuration related to a controller according to the first embodiment.

FIG. 2 is a diagram illustrating an example of a configuration related to the controller 101a. Since the controllers 101a and 101b have the same (identical or similar) configuration, the controller 101a will be illustrated and described.

The controller 101a includes one or more processors 201, one or more memories 202, one or more communication I/F (interfaces) 203, and one or more host I/F 204.

The processor 201 executes a program that implements a function of the controller 101a by using the memory 202 and provides the access to the LU to the host 105.

The communication I/F 203 is connected to the network 104. The communication I/F 203 transfers access request data involved in transmission of the access request from the controller 101a to the storage medium 106 of the storage medium node 102, reception of a response, and processing of the access request.

A communication standard for connecting the communication I/F 203 to the network 104 is not particularly limited as long as the access request, the transmission and reception of the response, and data transfer can be performed. Similarly, a protocol used for the transmission and reception of the access request, the response, and the data performed between the controller 101a and the storage medium node 102 is also not limited.

The host I/F 204 transfers access request data involved in reception of an access request to the LU from the host 105, transmission of a response, and processing of an access request with the host 105.

A communication standard and a protocol for the connection between the controller 101a and the host 105 via the host I/F 204 are not particularly limited as long as the transmission and reception of the access request and response and the data transfer can be performed. When the host 105 is connected to the network 104, the host I/F 204 may use the common configuration to the communication I/F 203.

Figure 3:
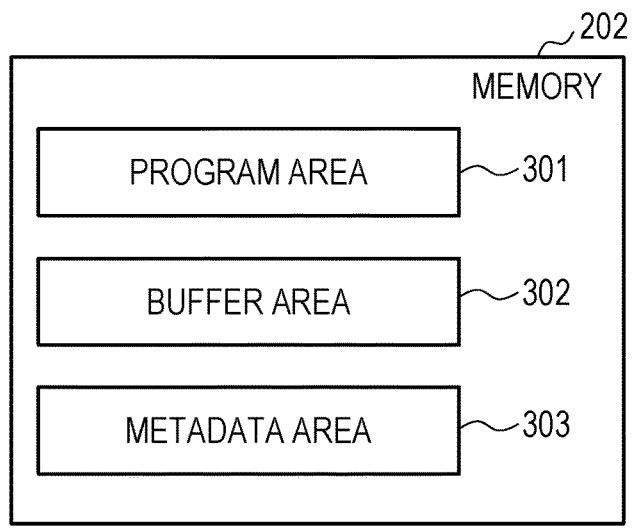
FIG. 3 is a diagram illustrating an example of stored data according to the first embodiment.

FIG. 3 is a diagram illustrating an example of stored data in the memory 202. The memory 202 includes a program area 301, a buffer area 302, and a metadata area 303.

The program area 301 stores a program executed by the processor 201 that executes the function of the controller 101 of the storage system 100.

The buffer area 302 temporarily stores the Read data read out from the storage medium 106 connected to the storage medium node 102 and the Write data for the storage medium 106 connected to the storage medium node 102.

The metadata area 303 stores management information related to the processing of each LU that the controller 101 provides access to the host 105.

Figure 4:
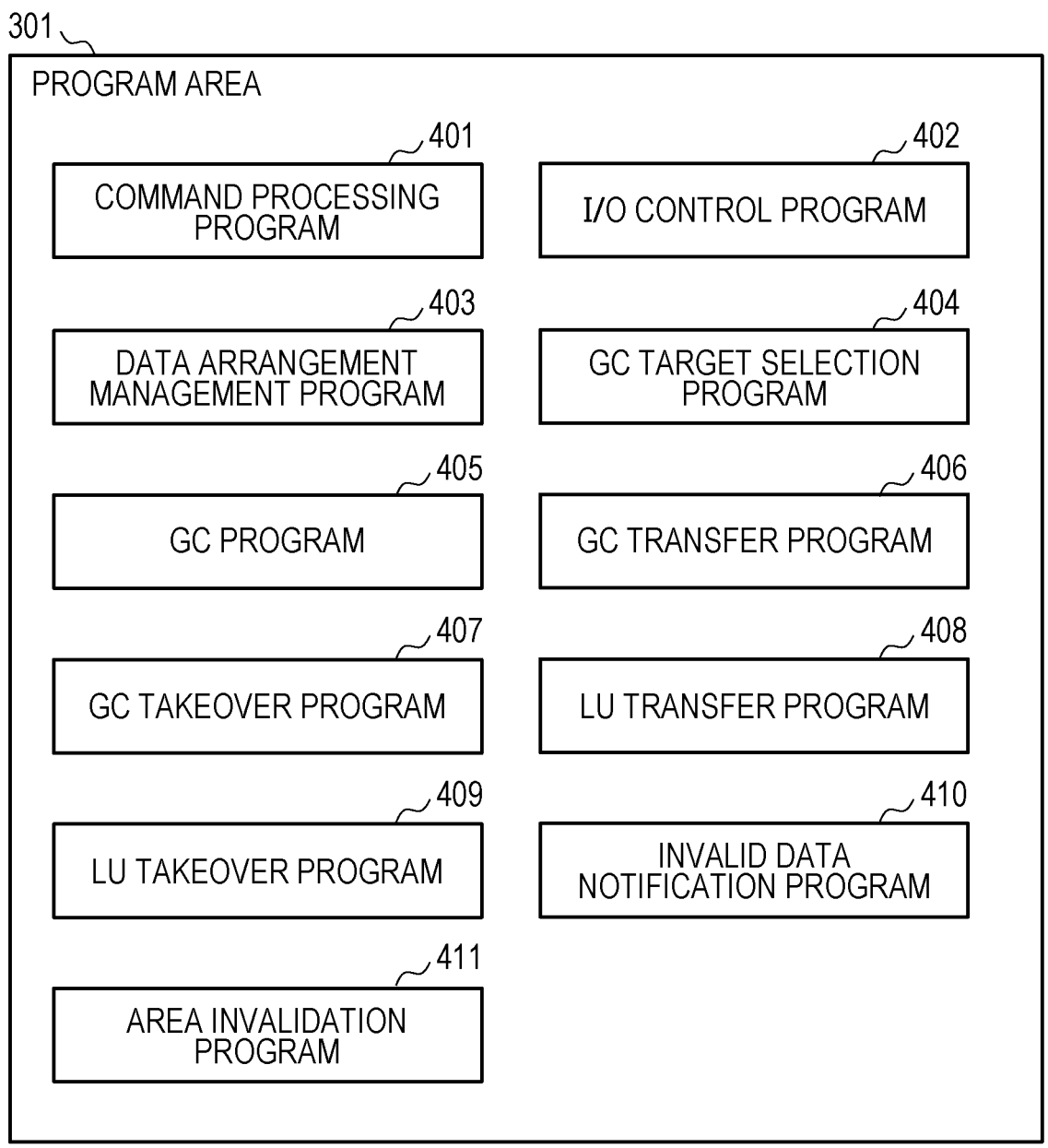
FIG. 4 is a diagram illustrating an example of a program area according to the first embodiment.

FIG. 4 is a diagram illustrating an example of the program area 301.

The program area 301 stores a program executed by the processor 201. As the program, there are a command processing program 401, an I/O control program 402, a data arrangement management program 403, a GC target selection program 404, a GC program 405, a GC transfer program 406, a GC takeover program 407, an LU transfer program 408, an LU takeover program 409, an invalid data notification program 410, and an area invalidation program 411.

The command processing program 401 receives the access request to the LU from the host 105 via the host I/F 204 and replies a result. The command processing program 401 starts processing corresponding to the access request, and transfers the access request data to and from the host 105 via the host I/F 204.

The I/O control program 402 executes the access request to the storage medium 106 included in the storage medium node 102 via the communication I/F 203. A protocol used for the access to the storage medium 106 from the I/O control program 402 is not particularly limited as long as access to a designated address can be performed.

The data arrangement management program 403 manages an address as a mapping destination corresponding to each storage area in the storage medium 106 connected to the storage medium node 102 for each storage area in an address space of the LU that the controller 101 provides access to the host 105. The data arrangement management program 403 manages the LU corresponding to each storage area constituted by the storage medium 106 connected to the storage medium node 102 and the address of the storage area in the LU.

The GC target selection program 404 selects, as the target of the GC processing, one of pages allocated to the own controller 101 from the storage areas (hereinafter, referred to as pages) having a fixed size constituted by the storage medium 106 connected to the storage medium node 102.

The GC program 405 relocates the data by moving valid data included in the page selected by the GC target selection program 404 to another page. The GC program 405 confirms the corresponding LU for each valid data included in the selected page, copies the data to another page when the access processing of the confirmed LU is allocated to the own controller 101, and invalidates the data on the original page.

The GC transfer program 406 selects one controller 101 to which the access processing of the LU corresponding to the valid data contained in the page as the target of the GC processing is allocated, and requests the takeover of the GC processing related to the page. The request to take over the GC processing can be performed asynchronously with the access processing, and can also be performed asynchronously with the GC processing for another page. The number of times of communication can be reduced by simultaneously requesting the takeover of the GC processing related to a plurality of pages to the identical controller 101. Since the number of pages used by the controller 101 is inversely proportional to a page size, the number of pages used is reduced by increasing the page size, and the number of times the takeover of the GC processing is requested is also reduced. Thus, the number of times of communication due to the GC transfer program 406 is reduced, and thus, it is possible to avoid the influence of the overhead by performing the request to take over the GC processing asynchronously with each of the access processing and the GC processing.

The GC takeover program 407 adds the page requested to take over the GC processing from another controller 101 to the page allocated to the own controller 101 such that the page is selected as the target of the GC processing by the GC target selection program 404.

The LU transfer program 408 requests another controller 101 to take over the access processing for the LU of which the access processing is allocated to the own controller 101. The LU transfer program 408 reads out metadata related to the LU requesting the takeover from the metadata area 303 and copies the metadata to the controller 101 requesting the takeover. Since the access processing of the LU is usually taken over only when load adjustment between the controllers 101 is required, the takeover is performed with the number of times lower than in the case of the access request from the host 105. Thus, the overhead associated with communication between the controllers 101 due to the LU transfer program 408 is minor.

The LU takeover program 409 starts the access processing of the LU by using the copied metadata for the LU requested to take over the access processing from another controller 101.

The invalid data notification program 410 notifies the controller 101 that manages the page containing each data of a list of addresses of storage destinations of data before update which is invalidated by the Write request from the host 105 to the LU. The notification of the invalid data to another controller 101 can be performed asynchronously with the access processing. The notification of invalidation of a plurality of data can be collectively performed with a single notification. Thus, it is possible to avoid influence of a communication overhead in the same manner as the communication of the GC transfer program 406.

The area invalidation program 411 invalidates the data in the corresponding storage area on the page managed by the own controller 101 while referring to the list of addresses of the storage destinations of the invalidated data notified from another controller 101.

Figure 5:
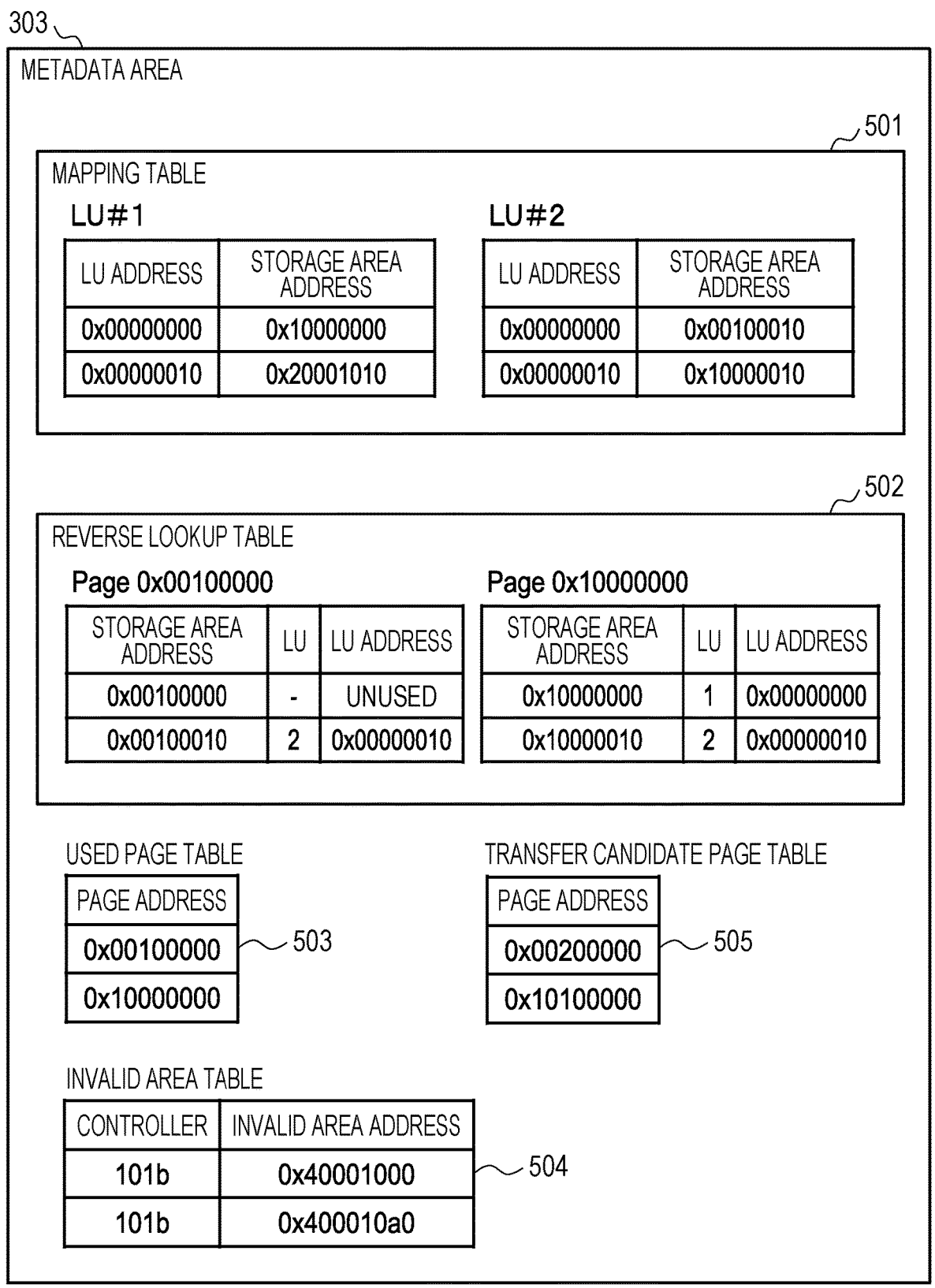
FIG. 5 is a diagram illustrating an example of a metadata area according to the first embodiment.

FIG. 5 is a diagram illustrating an example of the metadata area 303.

The metadata area 303 includes a mapping table 501, a reverse lookup table 502, a used page table 503, an invalid area table 504, and a transfer candidate page table 505.

The mapping table 501 is provided for each LU that performs the access processing. The mapping table 501 stores the address as the mapping destination corresponding to each area in the storage medium 106 connected to the storage medium node 102 for each storage area in the address space of the LU in which the controller 101 performs the access processing.

Here, in the storage system 100, a plurality of storage media 106 is provided as one virtual storage device by Redundant Arrays of Inexpensive Disks (RAID), and an address in the virtual storage device is a storage area address of the mapping table 501. Although not illustrated, the address in the virtual storage device is associated with the address in each storage medium 106. In the storage system 100, the RAID may not be built, and the storage area address of the mapping table 501 may be the address of the storage medium 106. In this case, the mapping table 501 includes information capable of identifying the storage medium 106.

The reverse lookup table 502 is provided for each page. The reverse lookup table 502 stores the LU and the address of the LU allocated with the storage area for the storage area which is allocated to the controller 101 and is constituted by the storage medium 106 connected to the storage medium node 102. Although the reverse lookup table 502 is provided for each page in the present embodiment, the format is not limited thereto. A single format may be used, a format divided into units other than the page may be used, or any other format may be used.

The used page table 503 stores the address of the page allocated to the controller 101.

The invalid area table 504 stores the address of the invalidated data stored in the page managed by another controller 101 and information of the controller 101 that manages the above page.

The transfer candidate page table 505 stores addresses of pages that are candidates for transferring the GC processing to another controller 101.

Figure 6:
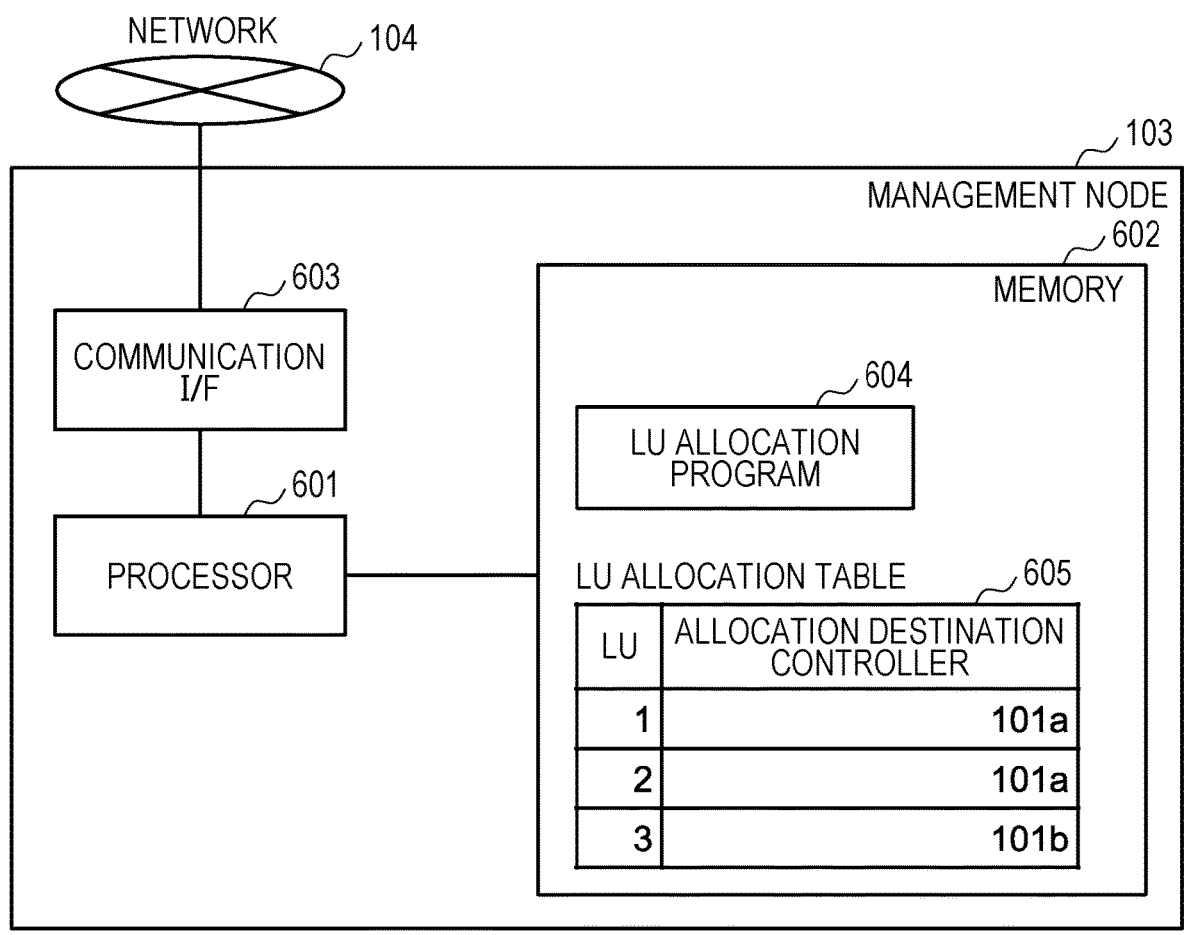
FIG. 6 is a diagram illustrating an example of a configuration related to a management node according to the first embodiment.

FIG. 6 is a diagram illustrating an example of a configuration related to the management node 103.

The management node 103 includes one or more processors 601, one or more memories 602, and one or more communication I/F 603.

The processor 601 provides an allocation status to the controller 101 regarding the access processing of the LU provided by the storage system 100 by using the memory 602. The processor 601 provides a management function of the allocation to the controller 101 regarding each storage area constituted by the storage medium 106 connected to the storage medium node 102 by using the memory 602.

The memory 602 stores an LU allocation program 604 and an LU allocation table 605.

The communication I/F 603 is connected to the network 104. The communication I/F 603 performs communication with the controller 101 regarding the access processing of the LU, the allocation of the storage area, and release of the storage area.

The LU allocation program 604 manages an allocation state of the access processing of the LU to the controller 101 of the storage system 100. The LU allocation program 604 responds to an inquiry of the controller 101 that performs the access processing of each LU.

The LU allocation table 605 stores the information of the controller 101 that performs the access processing of each LU provided by the storage system 100.

Figure 7:
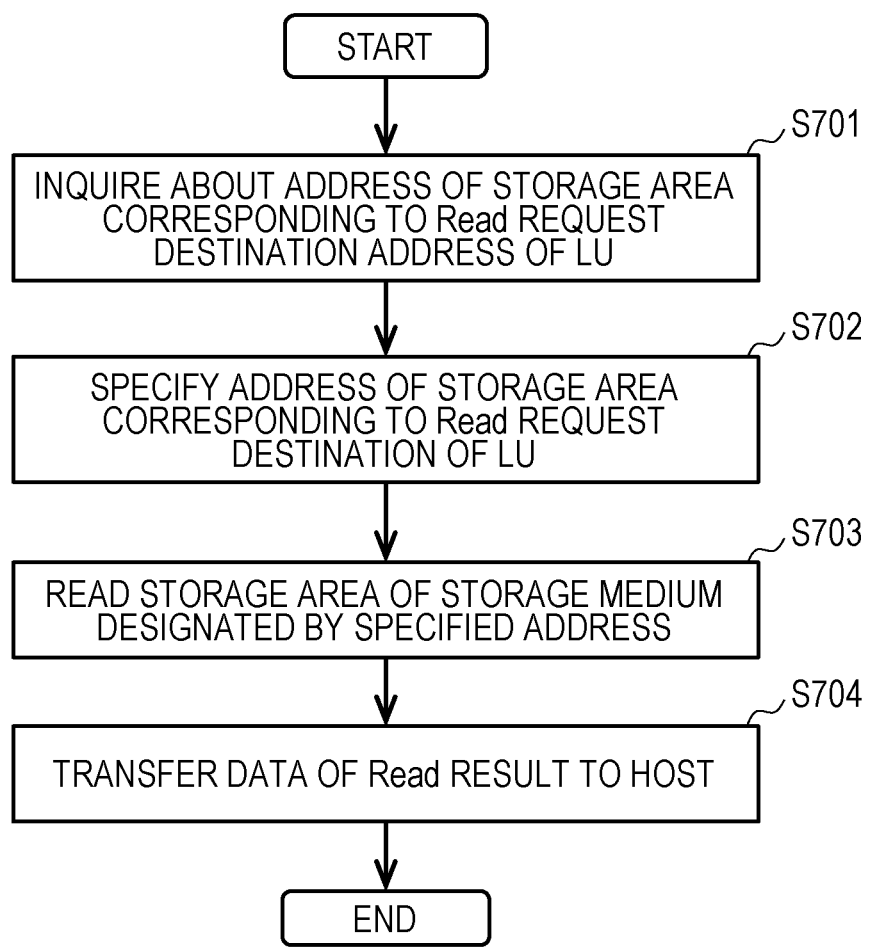
FIG. 7 is a diagram illustrating an example of a flowchart according to the first embodiment.

FIG. 7 is a flowchart illustrating a series of flows for processing the Read request of the LU from the host 105 to the controller 101a. Operations based on the flowchart of FIG. 7 are as follows.

S701: When the Read request of the LU is received from the host 105, the command processing program 401 inquires of the data arrangement management program 403 about the address of the storage area of the storage medium 106 corresponding to the address of the requested LU. Subsequently, S702 is performed.

S702: The data arrangement management program 403 specifies the storage medium 106 corresponding to the storage area corresponding to the address of the inquired LU and the address of the storage medium 106 and responds to the inquiry while referring to the mapping table 501. Subsequently, S703 is performed.

S703: The I/O control program 402 performs Read access to the address of the storage medium 106 instructed via the communication I/F 203, and stores the Read result data in the buffer area 302 of the memory 202. Subsequently, S704 is performed.

S704: The command processing program 401 transfers, as the result of the Read request, the data stored in the buffer area 302 in S703 to the host 105 via the host I/F 204, and ends a series of operations.

Figure 8:
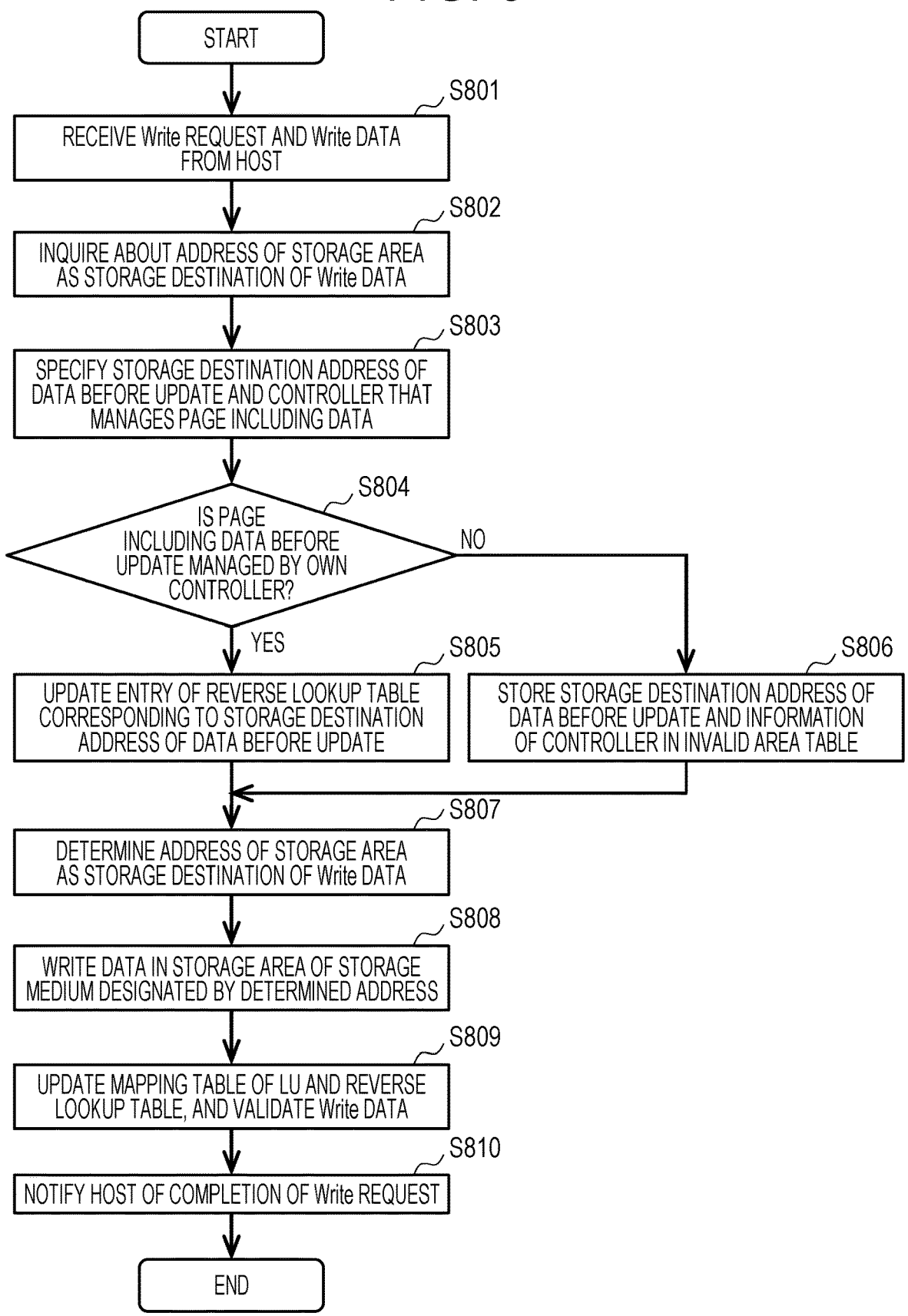
FIG. 8 is a diagram illustrating an example of a flowchart according to the first embodiment.

FIG. 8 is a flowchart illustrating a series of flows for processing the Write request of the LU from the host 105 to the controller 101a. Operations based on the flowchart of FIG. 8 are as follows.

S801: When the write request of the LU is received from the host 105 via the host I/F 204, the command processing program 401 receives the Write data from the host 105 and stores the Write data in the buffer area 302. Subsequently, S802 is performed.

S802: The command processing program 401 inquires the data arrangement management program 403 of the address to be the storage destination in the storage medium 106 connected to the storage medium node 102 of the Write data received in S801. Subsequently, S803 is performed.

S803: The data arrangement management program 403 specifies the storage medium 106 that stores the data before update of the storage area for which the Write request is issued by the host 105 and the address of the storage medium while referring to the mapping table 501. The data arrangement management program 403 specifies whether the controller 101 that manages the page including the storage area of the address is the own controller 101 while referring to the mapping table 501 and the used page table 503. Subsequently, S804 is performed.

S804: The data arrangement management program 403 determines whether or not the own controller 101 manages the page including the storage area of the address specified in S803. When the page including the data before update is managed by the own controller 101, the data arrangement management program 403 shifts the processing to S805. When the page including the data before update is not managed by the own controller 101, the data arrangement management program 403 shifts the processing to S806.

S805: The data arrangement management program 403 updates the corresponding entry in the reverse lookup table 502 such that the data before update corresponding to the address specified in S803 is invalid and is in a state of not being mapped to any LU. For example, the data arrangement management program 403 sets information indicating invalidity to the LU address of the entry. Subsequently, S807 is performed.

S806: The data arrangement management program 403 stores the address of the storage destination of the data before update and the information of the controller 101 in the invalid area table 504. More specifically, the data arrangement management program 403 stores the address specified in S803 in the invalid area table 504, as an address in which the invalid data notified to the controller 101 that manages the page including the storage area of the address is stored. Subsequently, S807 is performed.

S807: The data arrangement management program 403 determines the address of the storage area as the storage destination of the Write data received in S801 from the page managed by the own controller 101 and responds to the command processing program 401 while referring to the reverse lookup table 502 and the used page table 503. Subsequently, S808 is performed.

S808: The command processing program 401 notifies the I/O control program 402 of information of the storage medium 106 and the address determined in S807, and instructs Write access. The I/O control program 402 performs the Write access to the address of the storage medium 106 instructed via the communication I/F 203, and stores the Write data read out from the buffer area 302. Subsequently, S809 is performed.

S809: When the Write access in the I/O control program 402 is completed, the data arrangement management program 403 updates the mapping table 501 and the reverse lookup table 502 by using the address determined in S807 such that an address of a Write request destination of the host 105 corresponds to a storage area of a storage destination of new Write data. Subsequently, S810 is performed.

S810: The command processing program 401 notifies the host 105 of the completion of the Write request via the host I/F 204, and ends a series of operations.

The series of operations from S803 to S806 may be performed after S808. The operation of S809 may be performed before S808.

Figure 9:
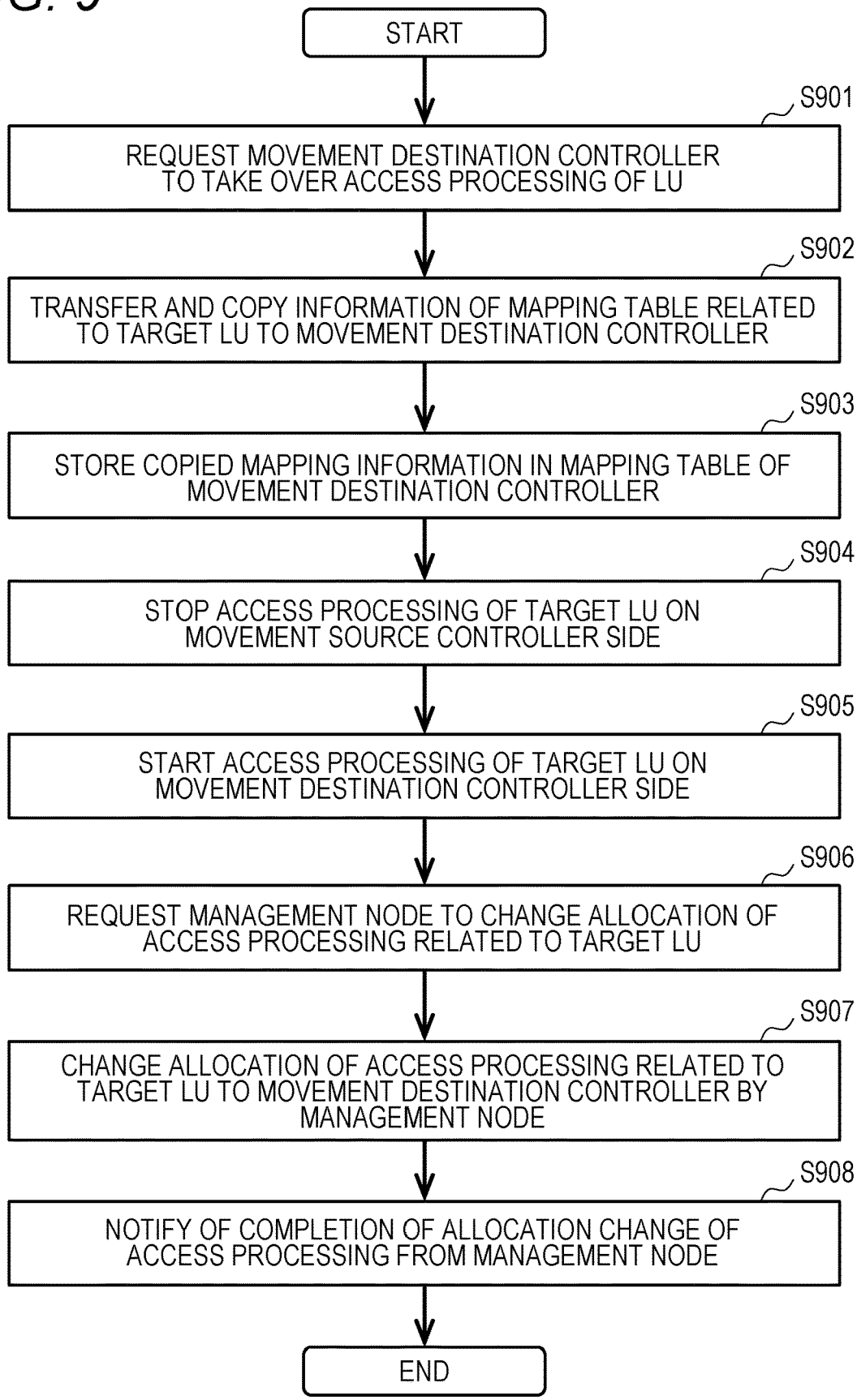
FIG. 9 is a diagram illustrating an example of a flowchart according to the first embodiment.

FIG. 9 is a flowchart illustrating a series of flows for moving the authority for the access processing of the LU from the controller 101a (movement source controller) to the controller 101b (movement destination controller). Operations based on the flowchart of FIG. 9 are as follows.

S901: The LU transfer program 408 of the controller 101a requests the controller 101b to take over the access processing of the LU. Subsequently, S902 is performed.

S902: The LU transfer program 408 of the controller 101a reads out the address of the mapping destination related to the address space of the LU from the mapping table 501 for the LU of which the authority for the access processing is to be moved, and copies the address to the controller 101b via the communication I/F 203. Subsequently, S903 is performed.

S903: The LU takeover program 409 of the controller 101b receives the address information of the mapping destination regarding the address space of the LU from the controller 101a and stores the address information in the mapping table 501 of the metadata area 303. Subsequently, S904 is performed.

S904: The LU transfer program 408 of the controller 101a stops the access processing of the LU to be moved in the controller 101a. Subsequently, S905 is performed.

S905: The LU takeover program 409 of the controller 101b starts the access processing of the LU to be moved in the controller 101b. Subsequently, S906 is performed.

S906: The LU takeover program 409 of the controller 101b requests the management node 103 to change the allocation destination of the access processing of the LU that starts the access processing in S905 from the controller 101a to the controller 101b. Subsequently, S907 is performed.

S907: The LU allocation program 604 of the management node 103 updates the LU allocation table 605 and changes the allocation destination of the access processing for the LU to be moved from the controller 101a to the controller 101b. Subsequently, S908 is performed.

S908: The LU takeover program 409 of the controller 101b notifies the host 105 that the access processing of the LU to be moved is changed to the controller 101b, and ends the series of operations.

The series of operations from S904 to S905 may be performed after S908. When the management node 103 can directly communicate with the host 105, the LU allocation program 604 of the management node 103 may notify the host 105 that the access processing of the LU is changed to the controller 101b instead of the LU takeover program 409 of the controller 101b in S908. In S906, the LU transfer program 408 of the controller 101a may request the management node 103 to change the allocation destination of the access processing instead of the LU takeover program 409 of the controller 101b.

FIG. 10 is a flowchart illustrating a series of flows for notifying the controller 101b of the storage area that stores the invalidated data from the controller 101a. Operations based on the flowchart of FIG. 10 are as follows.

S1001: The invalid data notification program 410 of the controller 101a starts notification processing of the invalid data at any time asynchronous with the access processing. Subsequently, S1002 is performed.

S1002: The invalid data notification program 410 of the controller 101a determines the controller 101 (in this example, the controller 101b) to be notified of the invalid data. Subsequently, S1003 is performed. When there is a plurality of controllers to be notified, any method can be adopted as the determination method of the controller.

S1003: The invalid data notification program 410 of the controller 101a reads out the address of the storage area in which the invalid data is stored and which is included in the page managed by the controller 101b to be notified of the invalid data while referring to the invalid area table 504 stored in the metadata area 303 of the controller 101a. Subsequently, S1004 is performed.

S1004: The invalid data notification program 410 of the controller 101a notifies the controller 101b to be notified of the invalid data of the address read in S1003 via the communication I/F 203. Subsequently, S1005 is performed.

S1005: The area invalidation program 411 of the controller 101b updates the corresponding entry such that the data of each storage area is invalid and is in a state of not being mapped to any LU for the reverse lookup table 502 stored in metadata area 303 while referring to the address of each storage area in which the invalid data which is notified from controller 101a is stored, and ends the series of operations.

In the flowchart illustrated in FIG. 10, the series of processing from S1002 to S1005 are executed once, but the storage area in which the invalidated data is stored may be notified to the plurality of controllers 101 by repeating the processing. The operation of S1005 is not continuously performed with the series of operations up to S1004, and may be performed at any time.

Figure 11A:
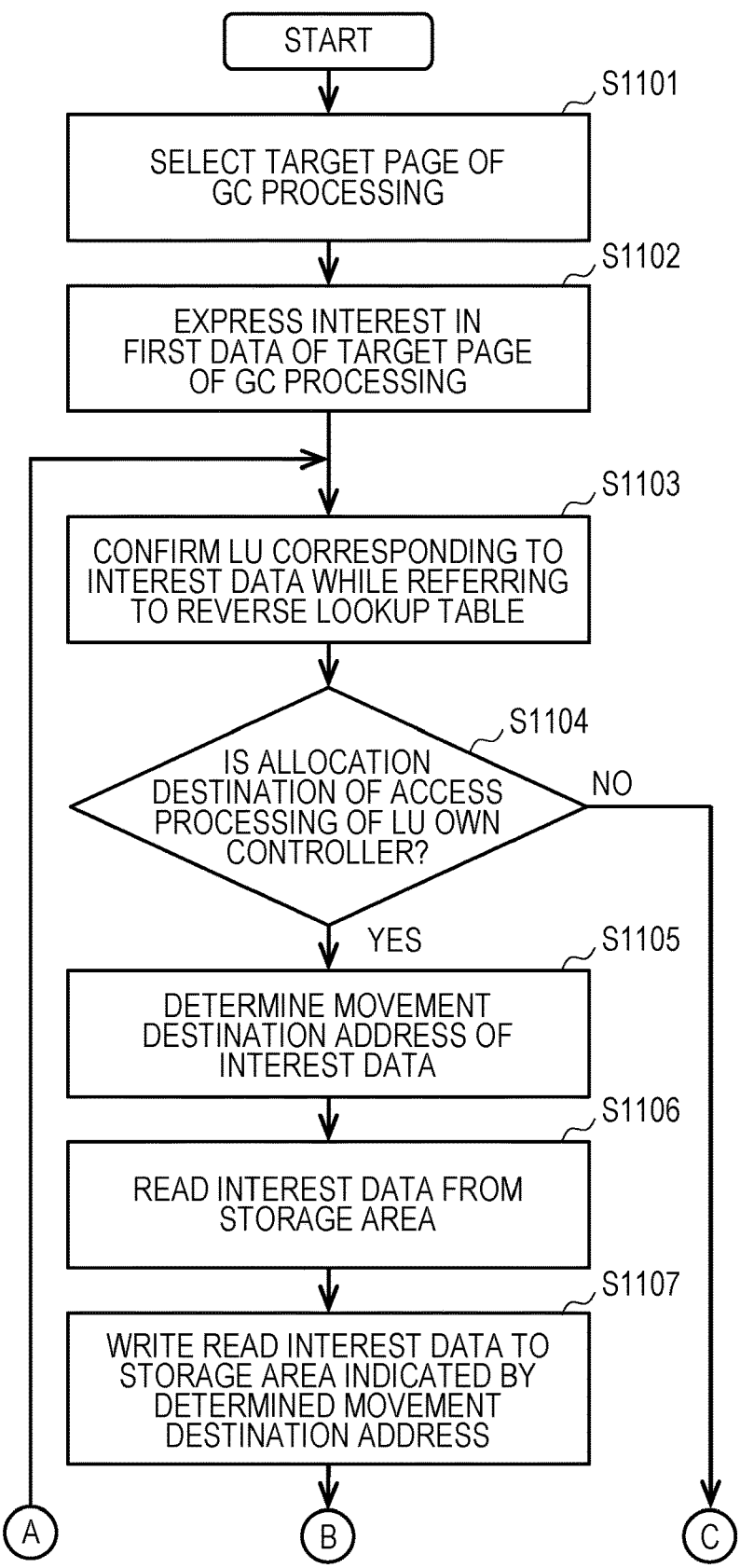
FIG. 11A is a diagram illustrating an example of a flowchart according to the first embodiment.
Figure 11B:
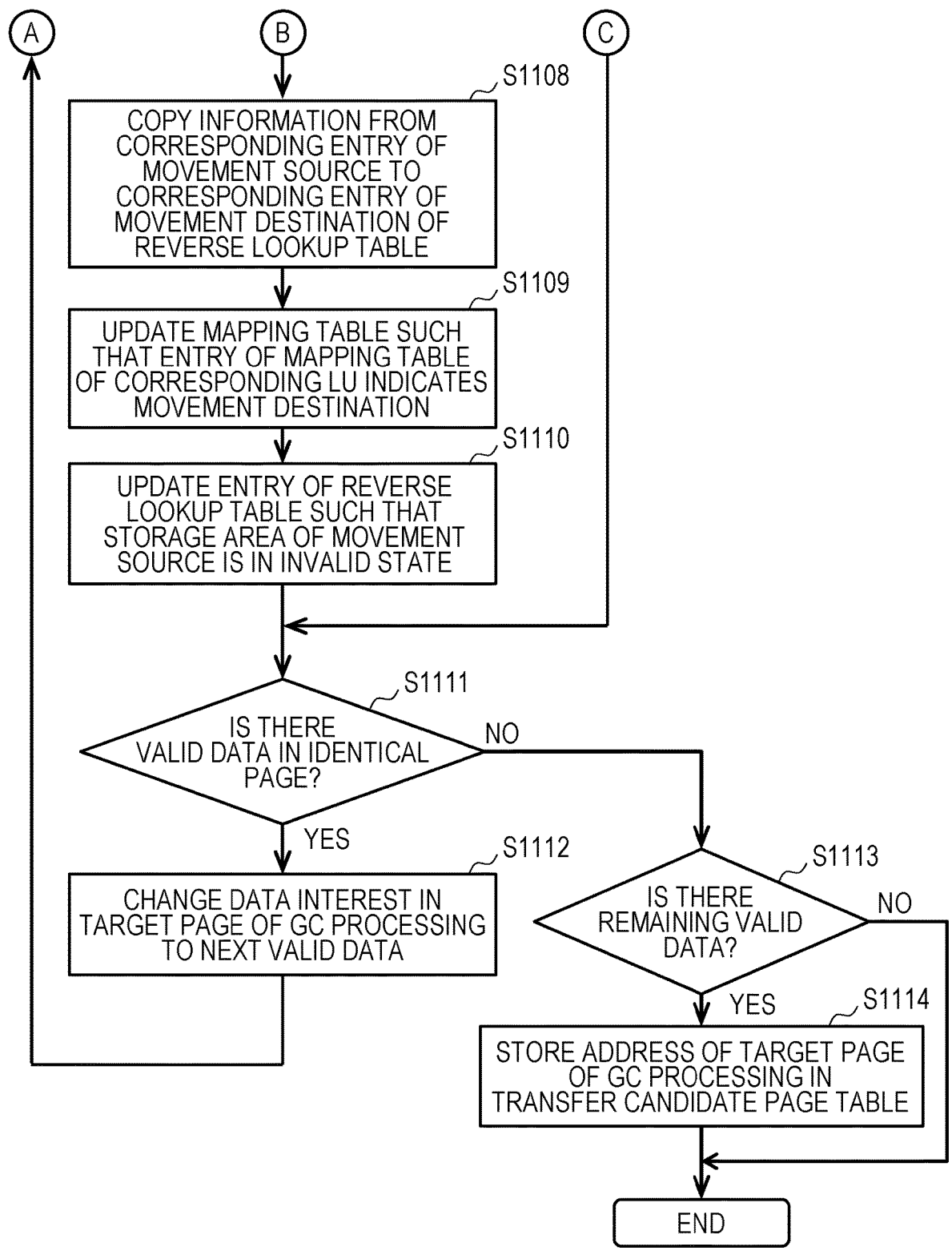
FIG. 11B is a diagram illustrating an example of a flowchart according to the first embodiment.

FIGS. 11A and 11B are flowcharts illustrating a series of flows for performing the GC processing regarding the page constituted by the storage medium 106 connected to the storage medium node 102 in the controllers 101a and 101b. Operations based on the flowcharts of FIGS. 11A and 11B are as follows.

S1101: The GC target selection program 404 selects the page as the target of the GC processing from the pages registered in the used page table 503 stored in the metadata area 303 at any time, and instructs the GC program 405 to perform processing. Subsequently, S1102 is performed.

S1102: The GC program 405 uses, as a target of interest, first valid data in the reverse lookup table 502 stored in the metadata area 303 corresponding to the page selected in S1101 in the subsequent processing. The valid data of interest in S1102 or S1112 is described as interest data. Subsequently, S1103 is performed.

S1103: The GC program 405 while referring to the corresponding entry in the reverse lookup table 502 stored in the metadata area 303 for the interest data, and confirms the LU to which the interest data corresponds. Subsequently, S1104 is performed.

S1104: The GC program 405 determines whether or not the access processing is allocated to the own controller 101 for the LU confirmed in S1103. When the access processing is allocated to the own controller 101, the GC program 405 shifts the processing to S1105. When the access processing is not allocated to the own controller 101, the GC program 405 shifts the processing to S1111.

S1105: The data arrangement management program 403 determines the address of the movement destination of the interest data from the pages other than the target of the GC processing managed by the own controller 101 while referring to the reverse lookup table 502 and the used page table 503. Subsequently, S1106 is performed.

S1106: The GC program 405 instructs the I/O control program 402 to perform the Read access by designating the address of the interest data. The I/O control program 402 performs the Read access to the interest data stored in the storage area of the storage medium 106 indicated by the instructed address, and stores data of the Read result in the buffer area 302 of the memory 202. Subsequently, S1107 is performed.

S1107: The GC program 405 instructs the I/O control program 402 to perform the Write access to the data on which the Read access is performed in S1106 by designating the address determined in S1105. The I/O control program 402 performs the Write access to the storage area of the storage medium 106 indicated by the designated address via the communication I/F 203, and stores data read out from the buffer area 302. Subsequently, S1108 is performed.

S1108: The data arrangement management program 403 copies the LU and the information of the address stored in the entry corresponding to the interest data to the entry corresponding to the address determined as the movement destination of the data in S1105 for the reverse lookup table 502 stored in the metadata area 303. Subsequently, S1109 is performed.

S1109: The data arrangement management program 403 while referring to the information of the LU and the address stored in the entry corresponding to the interest data for the reverse lookup table 502 stored in the metadata area 303. The data arrangement management program 403 updates the mapping table 501 stored in the metadata area 303 such that the entry corresponding to the LU and the address indicates the address determined in S1105. Subsequently, S1110 is performed.

S1110: The data arrangement management program 403 updates the reverse lookup table 502 stored in the metadata area 303 such that the entry corresponding to the interest data is in an invalid state of not being included in any LU. Subsequently, S1111 is performed.

S1111: The GC program 405 determines whether or not there is the next valid data of the interest data in the identical page. When there is the valid data in the identical page, the GC program 405 shifts the processing to S1112. When there is no valid data in the identical page, the GC program 405 shifts the processing to S1113.

S1112: The GC program 405 changes the interest data in the page as the target of the GC processing to the next valid data. Subsequently, S1103 is performed.

S1113: The GC program 405 determines whether or not there is the remaining valid data in the page as the target of the GC processing. When there is the remaining valid data in the page as the target of the GC processing, the GC program 405 shifts the processing to S1114. When there is no remaining valid data in the page as the target of the GC processing, the GC program 405 ends the series of operations.

S1114: The GC program 405 stores the address of the page as the target of the GC processing in the transfer candidate page table 505, and ends the series of operations.

Figure 12:
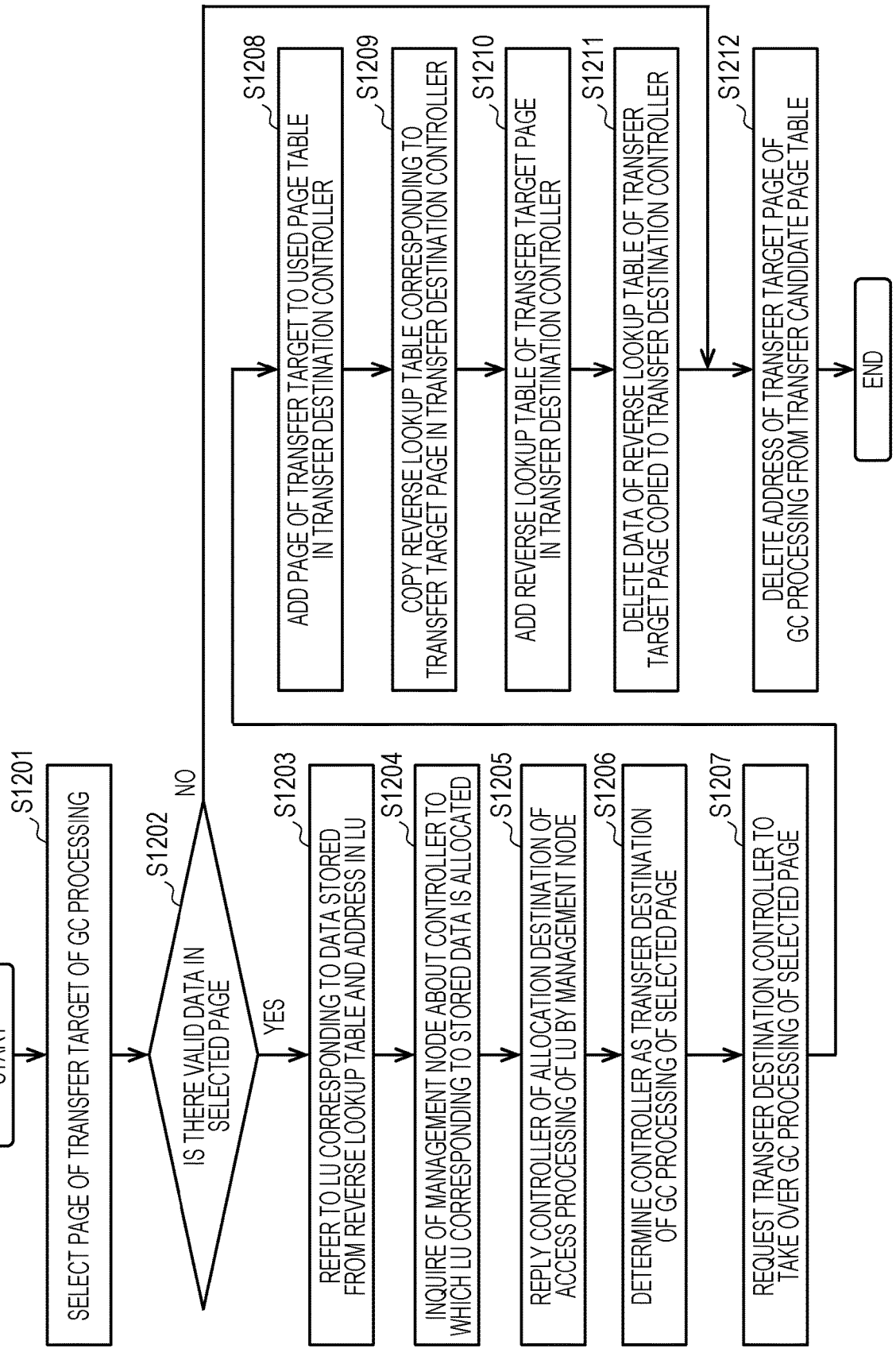
FIG. 12 is a diagram illustrating an example of a flowchart according to the first embodiment.

FIG. 12 is a flowchart illustrating a series of flows for transferring the GC processing related to the page constituted by the storage medium 106 connected to the storage medium node 102 in the controller 101a (transfer source controller) to the controller 101b (transfer destination controller). Operations based on the flowchart of FIG. 12 are as follows.

S1201: The GC transfer program 406 of the controller 101a selects the page to be transferred from the transfer candidate page table 505 stored in the metadata area 303 of the memory 202. Subsequently, S1202 is performed. The GC transfer program 406 of the controller 101a may start the processing at any time asynchronous with the GC processing of the GC program 405.

S1202: The GC transfer program 406 of the controller 101a determines whether or not there is the valid data while referring to the reverse lookup table 502 stored in the metadata area 303 for the page selected in S1201. When there is the valid data, the GC transfer program 406 of the controller 101a transfers the processing to S1203. When there is no valid data, the GC transfer program 406 of the controller 101a transfers the processing to S1212.

S1203: The GC transfer program 406 of the controller 101a refers to, for the page selected in S1201, the LU corresponding to the stored data and the address of the LU from the entry of the reverse lookup table 502 stored in the metadata area 303. Subsequently, S1204 is performed.

S1204: The GC transfer program 406 of the controller 101a inquires of the management node 103 about the controller 101 to which the access processing of the LU corresponding to the valid data referred to in S1203 is allocated via the communication I/F 203. Subsequently, S1205 is performed.

S1205: The LU allocation program 604 of the management node 103 confirms the controller 101 to which the access processing is allocated, and replies the controller via the communication I/F 603 while referring to the LU allocation table 605 for the LU inquired from the controller 101a in S1204. Subsequently, S1206 is performed.

S1206: The GC transfer program 406 of the controller 101a confirms the response result from the management node 103 for the controller 101 to which the access processing of the LU is allocated which is inquired in S1204, and determines the controller 101 as a transfer destination related to the GC processing of the page selected in S1201 (in this example, the controller 101b). Subsequently, S1207 is performed.

S1207: The GC transfer program 406 of the controller 101a requests the controller 101b to take over the GC processing by notifying the controller of the page address via the communication I/F 203. Subsequently, S1208 is performed.

S1208: The GC takeover program 407 of the controller 101b receives the address of the page from the controller 101a via the communication I/F 203 and stores the address in the used page table 503 included in the metadata area 303 of the controller 101b. Subsequently, S1209 is performed.

S1209: The GC transfer program 406 of the controller 101a reads out the entry of the reverse lookup table 502 stored in the metadata area 303 and copies the entry to the controller 101b via the communication I/F 203 for the page requesting the takeover of the GC processing. Subsequently, S1210 is performed.

S1210: The GC takeover program 407 of the controller 101b stores the entry of the reverse lookup table 502 of the controller 101a received from the controller 101a via the communication I/F 203 in the reverse lookup table 502 of the controller 101b. Subsequently, S1211 is performed.

S1211: The GC transfer program 406 of the controller 101a deletes the entry corresponding to the page requested to take over the GC processing for the reverse lookup table 502 stored in the metadata area 303. Subsequently, S1212 is performed.

S1212: The GC transfer program 406 of the controller 101a deletes the address of the page requested to take over the GC processing from the transfer candidate page table 505 stored in the metadata area 303, and ends the series of operations.

According to the present embodiment, in the storage system 100 in which the plurality of controllers 101 shares the storage area, a state in which dependence between the controllers 101 is reduced can be maintained while achieving a load distribution between the controllers 101 by moving the access processing and the storage area management. The dependence between the controllers 101 is eliminated as much as possible by separating the storage destinations of the data in the access processing of each controller 101 and sharing the relocation of the data related to the LU to which the access processing is allocated by each controller 101 in the GC processing for the storage area, and it is possible to avoid the influence of the overhead due to the communication.

(2) Second Embodiment

In the present embodiment, an example of a storage system that dynamically allocates and releases the shared storage area to and from the controller 101 by thin provisioning on a page-by-page basis in addition to moving and distributing the access processing and the storage area management between the controllers 101 will be described.

The present embodiment does not limit the scope of claims in the present invention, and not all of elements described in the present embodiment are necessary for solving the problem in the present invention. In the description of the present embodiment, differences in the configurations and the operations in the first embodiment will be described, and the components, the reference signs, and the operations which are not described are the same as those in the first embodiment.

Figure 13:
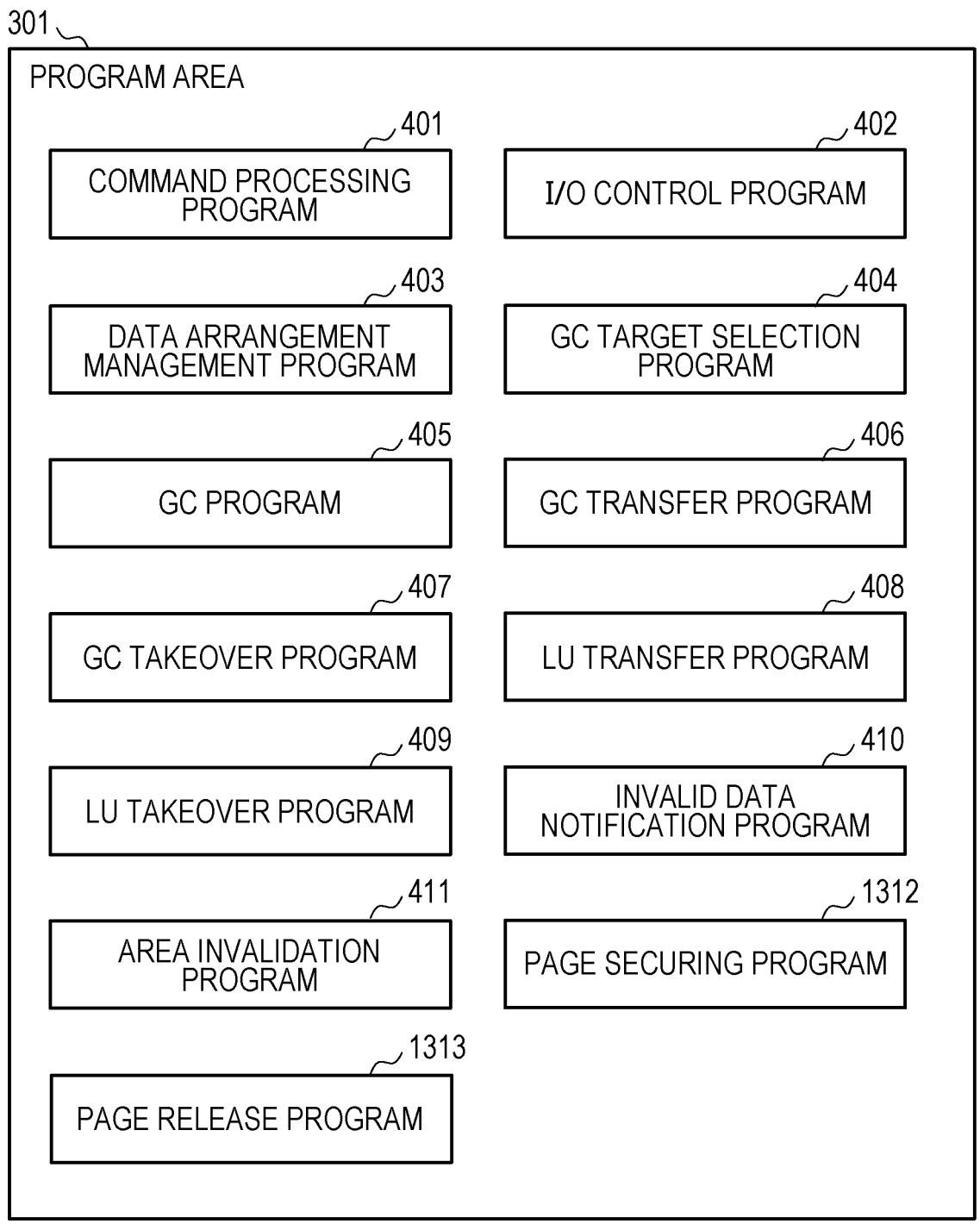
FIG. 13 is a diagram illustrating an example of a program area according to a second embodiment.

FIG. 13 is a diagram illustrating an example of the program area 301 in the present embodiment.

In the program area 301, a page securing program 1312, and a page release program 1313 are stored in addition to a command processing program 401, an I/O control program 402, a data arrangement management program 403, a GC target selection program 404, a GC program 405, a GC transfer program 406, a GC takeover program 407, an LU transfer program 408, an LU takeover program 409, an invalid data notification program 410, and an area invalidation program 411.

The page securing program 1312 requests the management node 103 to allocate an available page that is not allocated to any of the controllers 101 among the pages constituted by the storage media 106 connected to the storage medium node 102, and adds the available page as the page (used page) managed by the own controller 101.

The page release program 1313 notifies the management node 103 such that the page in the state of being allocated as the page managed by the own controller 101.

Figure 14:
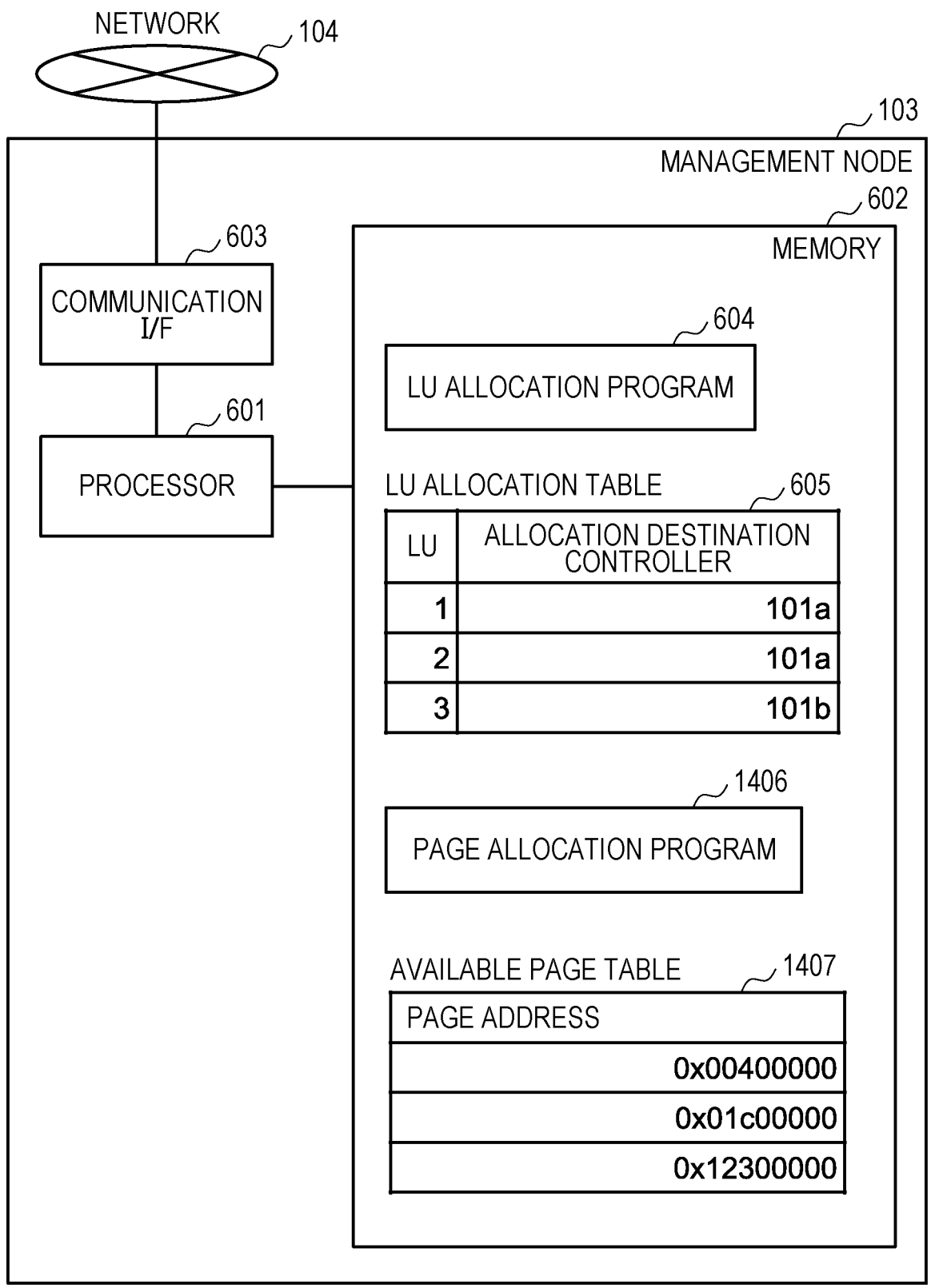
FIG. 14 is a diagram illustrating an example of a configuration related to a management node according to the second embodiment.

FIG. 14 is a diagram illustrating an example of a configuration related to the management node 103 in the present embodiment.

The management node 103 includes one or more processors 601, one or more memories 602, and one or more communication I/F 603.

The memory 602 stores a page allocation program 1406 and an available page table 1407 in addition to the LU allocation program 604 and the LU allocation table 605.

The page allocation program 1406 allocates and releases the page constituted by the storage medium 106 connected to the storage medium node 102 in response to the request from the controller 101 of the storage system 100.

The available page table 1407 stores the address of the page constituted by the storage medium 106 connected to the storage medium node 102 in a state of not being allocated to any of the controllers 101.

Figure 15:
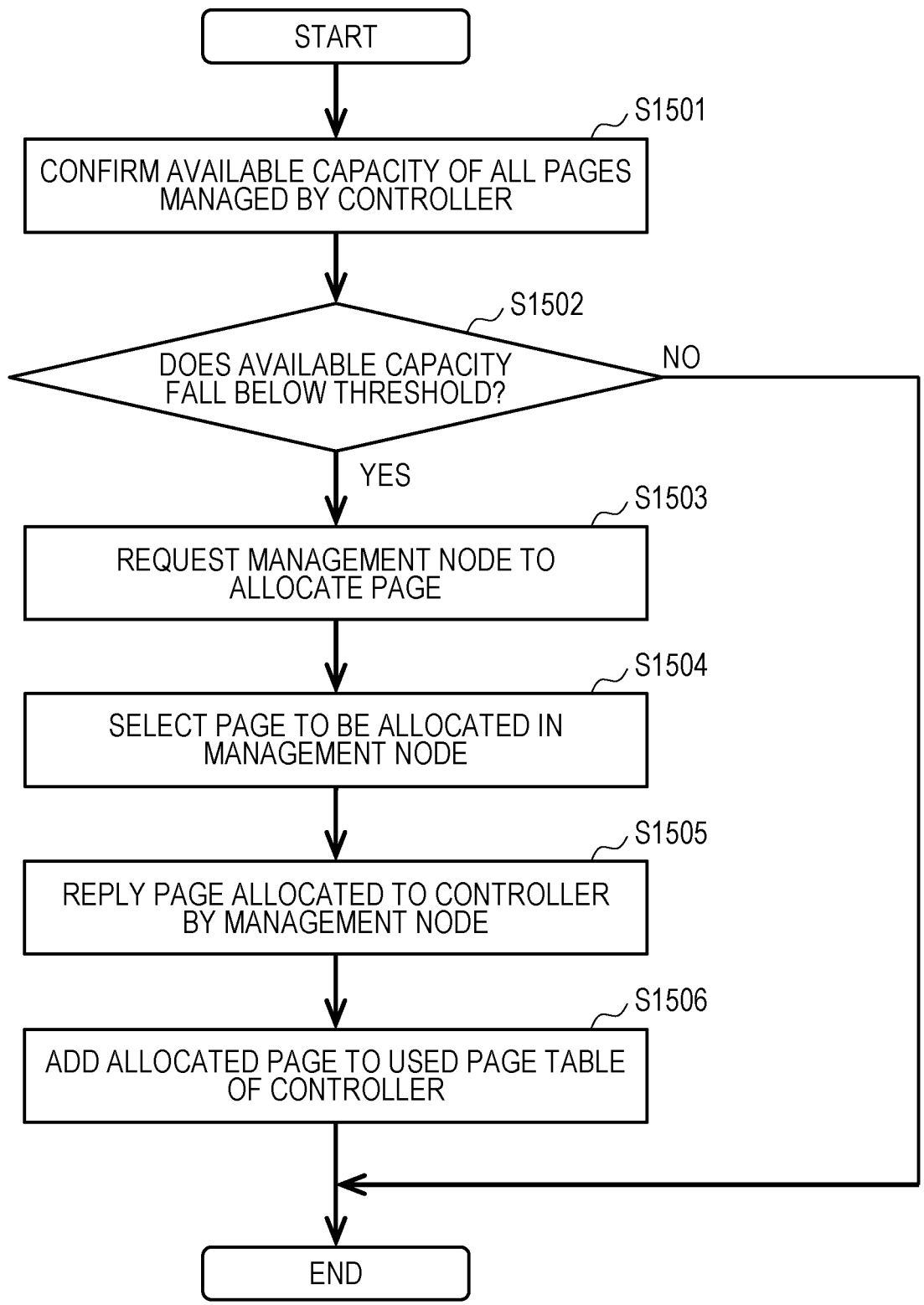
FIG. 15 is a diagram illustrating an example of a flowchart according to the second embodiment.

FIG. 15 is a flowchart illustrating a series of flows for securing the controllers 101a and 101b the pages in the present embodiment. Operations based on the flowchart of FIG. 15 are as follows.

S1501: The data arrangement management program 403 confirms the available capacity of all the pages (storage areas used) managed by the controller 101 while referring to the reverse lookup table 502 and the used page table 503 at any time. Subsequently, S1502 is performed.

S1502: The data arrangement management program 403 determines whether or not the available capacity of the storage areas confirmed in S1501 falls below a predetermined threshold. When the available capacity falls below the threshold, the data arrangement management program 403 shifts the processing to S1503. When the available capacity does not fall below the threshold, the data arrangement management program 403 ends the series of operations.

S1503: The page securing program 1312 requests the management node 103 to allocate the page to the controller 101 via the communication I/F 203. Subsequently, S1504 is performed.

S1504: When the request to allocate the page in S1503 is received via the communication I/F 603, the page allocation program 1406 of the management node 103 selects the page to be allocated while referring to the available page table 1407. Subsequently, S1505 is performed.

S1505: The page allocation program 1406 of the management node 103 notifies the controller 101 that requests the allocation of the page of the address of the page selected in S1504 via the communication I/F 603, and deletes the address of the page from the available page table 1407. Subsequently, S1506 is performed.

S1506: The page securing program 1312 receives the address allocated from the management node 103 via the communication I/F 203, stores the received address in the used page table 503, and ends the series of operations.

In S1504, the page allocation program 1406 may select the addresses of the plurality of pages, and may simultaneously allocate the plurality of pages to the controller 101. In S1501, the data arrangement management program 403 may confirm the available capacity based on the used capacity of the storage area separately managed instead of referring to the reverse lookup table 502.

Figure 16:
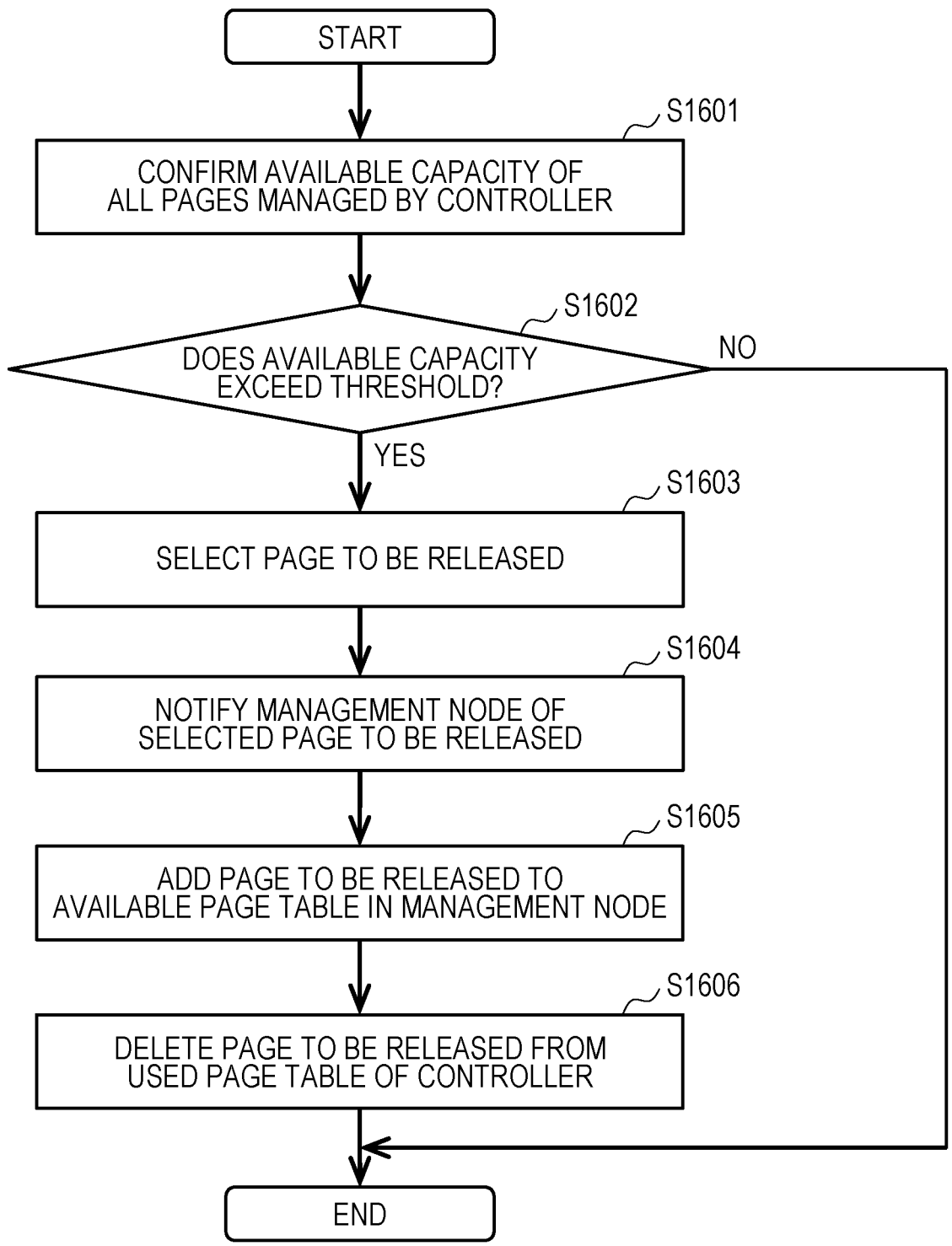
FIG. 16 is a diagram illustrating an example of a flowchart according to the second embodiment.

FIG. 16 is a flowchart illustrating a series of flows for releasing the pages by the controllers 101a and 101b in the present embodiment. Operations based on the flowchart of FIG. 16 are as follows.

S1601: The data arrangement management program 403 confirms the available capacity of all the pages (storage areas used) managed by the controller 101 while referring to the reverse lookup table 502 and the used page table 503 at any time. Subsequently, S1602 is performed.

S1602: The data arrangement management program 403 determines whether or not the available capacity of the storage area confirmed in S1601 exceeds a predetermined threshold. When the available capacity exceeds the threshold, the data arrangement management program 403 shifts the processing to S1603. When the available capacity does not exceed the threshold, the data arrangement management program 403 ends the series of operations.

S1603: The data arrangement management program 403 selects, as a page to be released, the page on which the data is not stored while referring to the reverse lookup table 502 and the used page table 503. Subsequently, S1604 is performed.

S1604: The page release program 1313 notifies the management node 103 of the address of the page selected in S1603 as the page to be released via the communication I/F 203. Subsequently, S1605 is performed.

S1605: When the address of the page to be released is received via the communication I/F 603, the page allocation program 1406 of the management node 103 stores the address in the available page table 1407. Subsequently, S1606 is performed.

S1606: The data arrangement management program 403 deletes the address of the page selected in S1603 from the used page table 503, and ends the series of operations.

In S1603, the data arrangement management program 403 may select the addresses of the plurality of pages, and may simultaneously release the plurality of pages. In S1601, the data arrangement management program 403 may confirm the available capacity based on the used capacity of the storage area separately managed instead of referring to the reverse lookup table 502.

According to the present embodiment, in the storage system 100 in which the plurality of controllers 101 shares the storage area, when the authority for the storage area management is moved in order to take over and share the GC processing for the storage area between the controllers 101, it is possible to eliminate the insufficiency and bias of the storage area managed by each controller 101. A unit of the GC processing matches an allocation unit of the storage area to the controller 101 by thin provisioning, and thus, release processing and reallocation can also be performed on the storage area for which the management authority is moved due to the takeover of the GC processing in the same manner as another storage area.

(3) Third Embodiment

In the present embodiment, an example of a storage system 100 that performs deduplication of the stored data in each controller 101 in addition to moving and distributing the access processing and the storage area management between the controllers 101 will be described.

The present embodiment does not limit the scope of claims in the present invention, and not all of elements described in the present embodiment are necessary for solving the problem in the present invention. In the description of the present embodiment, differences in the configurations and the operations in the first embodiment will be described, and the components, the reference signs, and the operations which are not described are the same as those in the first embodiment.

Figure 17:
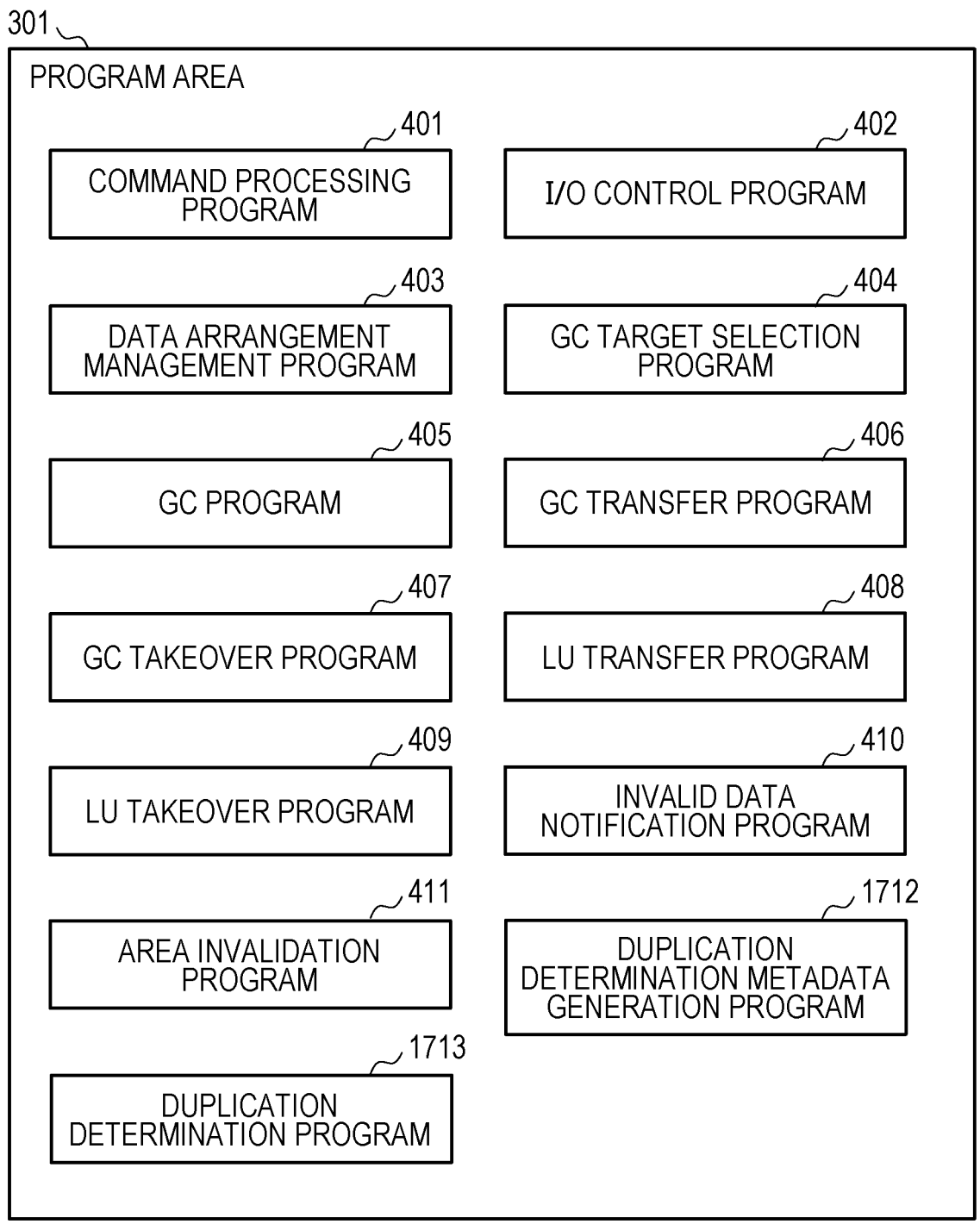
FIG. 17 is a diagram illustrating an example of a program area according to a third embodiment.

FIG. 17 is a diagram illustrating an example of the program area 301 in the present embodiment.

In the program area 301, a duplication determination metadata generation program 1712 and a duplication determination program 1713 are stored in addition to the command processing program 401, the I/O control program 402, the data arrangement management program 403, the GC target selection program 404, the GC program 405, the GC transfer program 406, the GC takeover program 407, the LU transfer program 408, the LU takeover program 409, the invalid data notification program 410, and the area invalidation program 411.

The invalid data notification program 410 notifies the controller 101 that manages the page including each data of a list of combinations of the address of the storage destination of the data before update invalidated by the Write request to the LU from the host 105, the LU corresponding to the address, and the address in the LU. The invalid data notification program 410 can notify another controller 101 of the invalid data asynchronously with the access processing. The invalid data notification program 410 can collectively notify the invalidation of the plurality of data with a single notification. Thus, it is possible to avoid influence of a communication overhead in the same manner as the communication of the GC transfer program 406.

The area invalidation program 411 invalidates the corresponding data of the storage area in the page managed by the own controller 101 while referring to the address of the storage destination of the invalidated data and the list of combinations of the LU and the addresses in the LU which are notified from the other controller 101.

The duplication determination metadata generation program 1712 generates metadata used for determining whether or not data matches the data stored in the shared storage area constituted by the storage medium 106 connected to the storage medium node 102. The metadata is, for example, a hash value of the data.

The duplication determination program 1713 detects data matching the data to be written in the storage area from the stored data by using the metadata generated by the duplication determination metadata generation program 1712.

Figure 18:
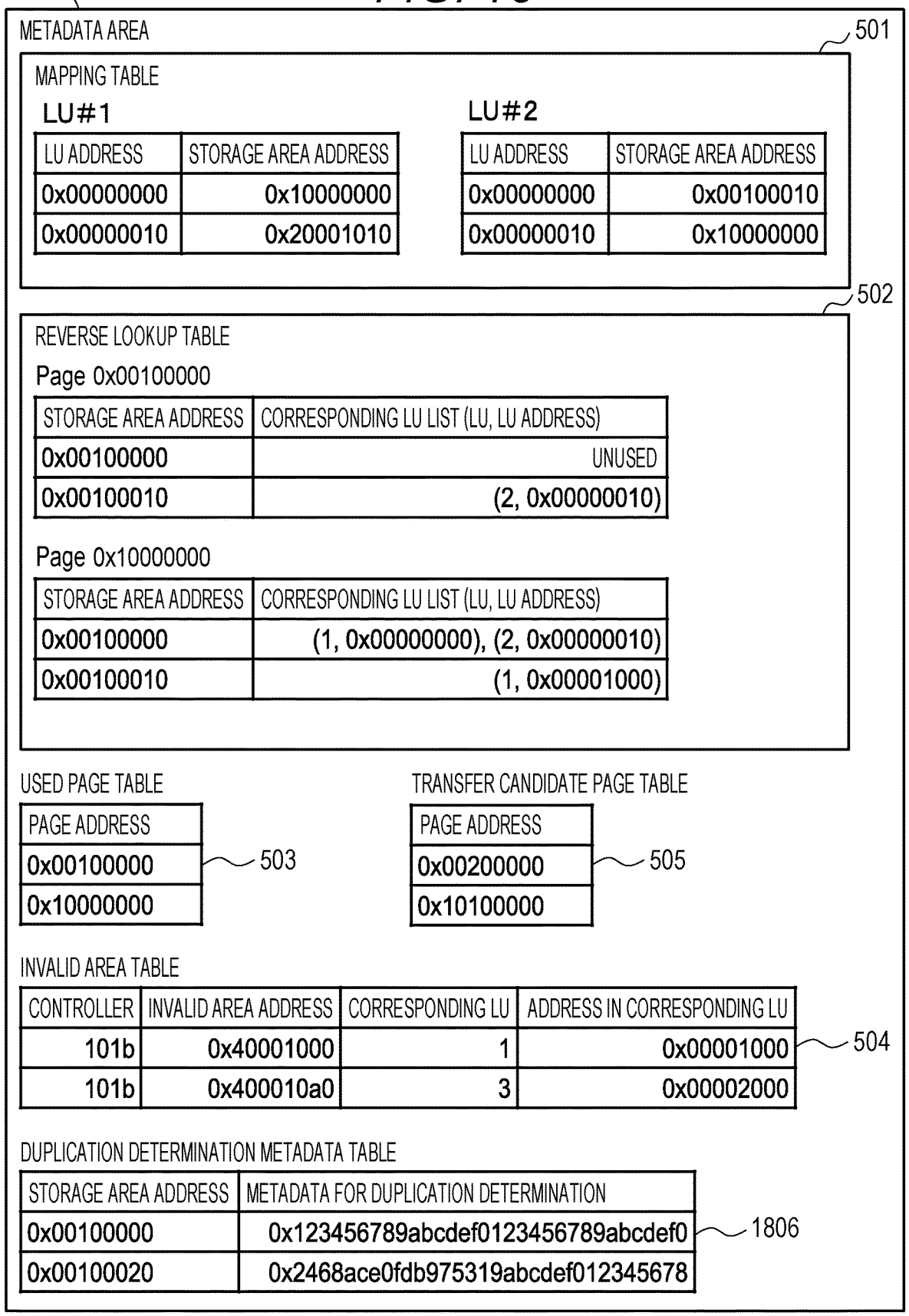
FIG. 18 is a diagram illustrating an example of a metadata area according to the third embodiment.

FIG. 18 is a diagram illustrating an example of the metadata area 303 in the present embodiment.

The metadata area 303 includes a duplication determination metadata table 1806 in addition to the mapping table 501, the reverse lookup table 502, the used page table 503, the invalid area table 504, and the transfer candidate page table 505.

The reverse lookup table 502 stores the LU associated with the storage area and the address of the LU for the storage areas constituted by the storage media 106 connected to the storage medium node 102 allocated to the controllers 101a and 101b. When the data in each storage area is referred to in duplicate, the plurality of LUs and the addresses of the LUs are associated with each other.

The invalid area table 504 stores the information of the storage area that is not referred to in the page managed by another controller 101 due to the update of the data of the LU. Each information includes a combination of the address that is not referred to in the storage area constituted by the storage medium 106 connected to the storage medium node 102, the controller 101 that manages the page, the LU corresponding to the address, and the address in the LU.

The duplication determination metadata table 1806 stores the metadata used for determining duplicate data generated by the duplication determination metadata generation program 1712.

Figure 19A:
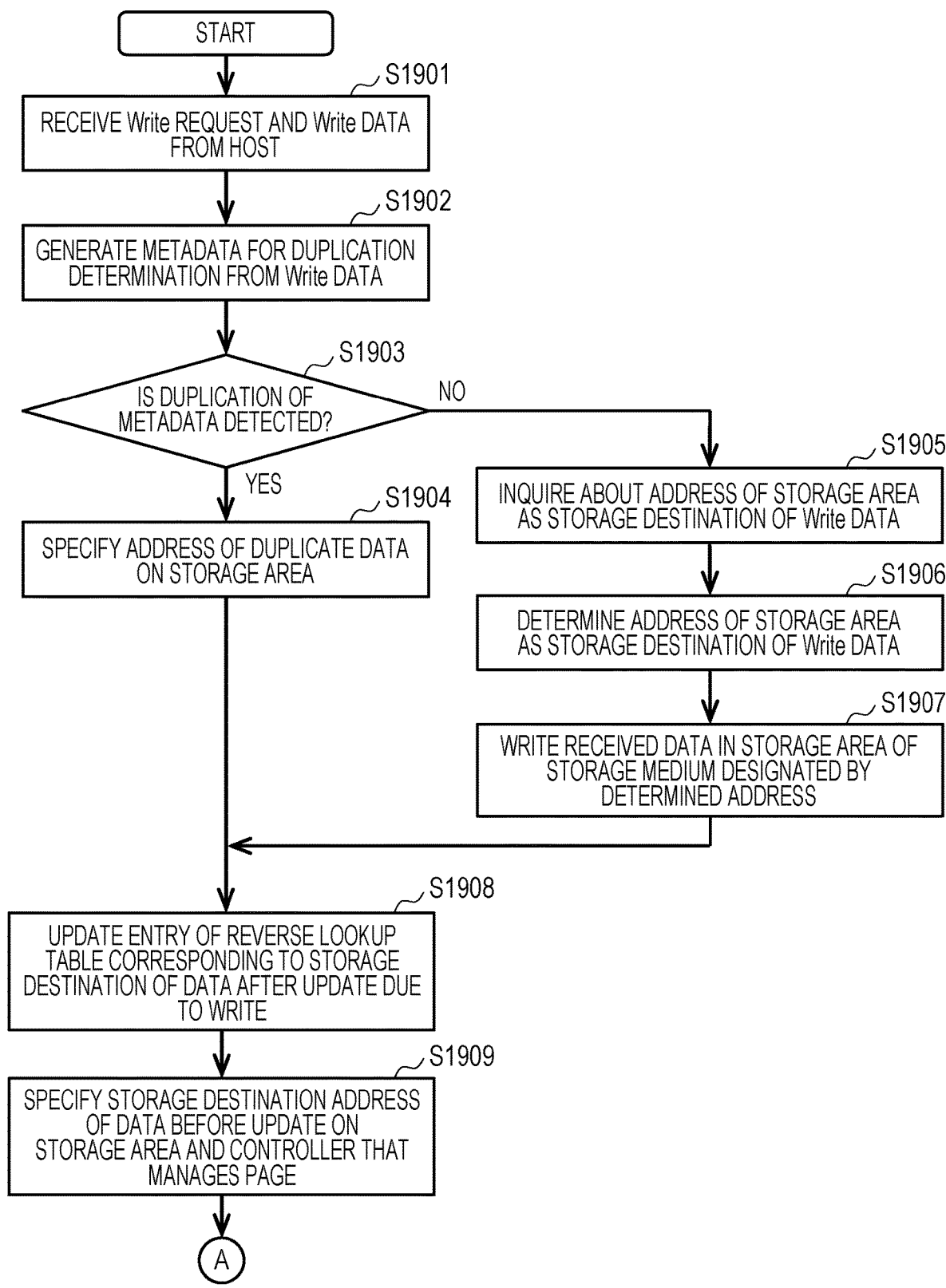
FIG. 19A is a diagram illustrating an example of a flowchart according to the third embodiment.
Figure 19B:
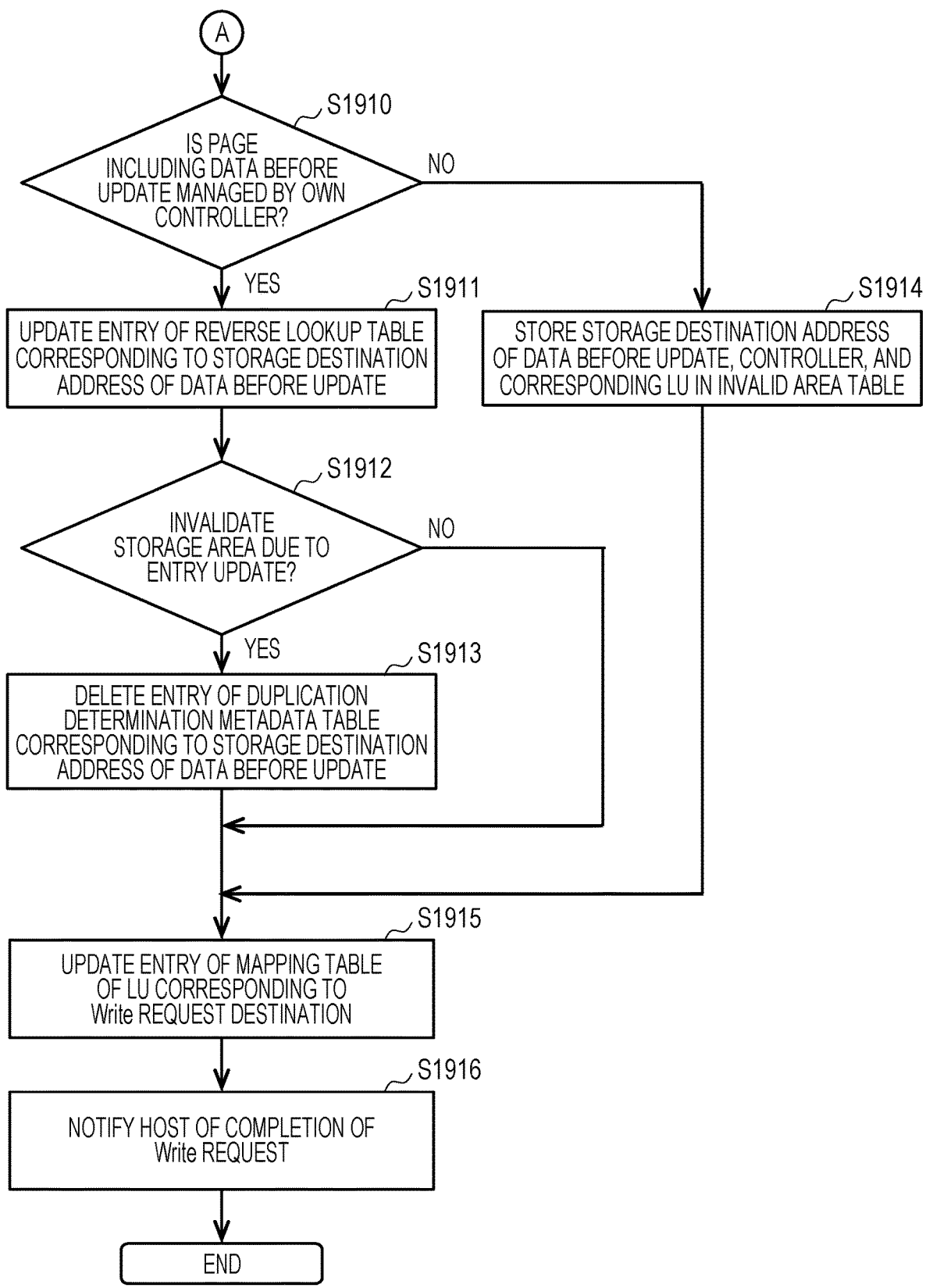
FIG. 19B is a diagram illustrating an example of a flowchart according to the third embodiment.

FIGS. 19A and 19B are flowcharts illustrating a series of flows for processing the Write request of the LU to the controller 101a from the host 105 in the present embodiment. Operations based on the flowcharts of FIGS. 19A and 19B are as follows.

S1901: When the Write request of the LU is received from the host 105 via the host I/F 204, the command processing program 401 receives the Write data from the host 105, and stores the Write data in the buffer area 302. Subsequently, S1902 is performed.

S1902: The duplication determination metadata generation program 1712 reads out the Write data received in S1901 from the buffer area 302 and generates the metadata for the duplication determination. Subsequently, S1903 is performed.

S1903: The duplication determination program 1713 determines whether or not there is metadata matching the metadata for the duplication determination generated in S1902 (whether or not the duplication of the metadata is detected) while or referring to the duplication determination metadata table 1806. When the duplication of the metadata is detected, the duplication determination program 1713 shifts the processing to S1904. When the duplication of the metadata is not detected, the duplication determination program 1713 shifts the processing to S1905.

S1904: The duplication determination program 1713 specifies the address of the storage destination in the storage medium 106 connected to the storage medium node 102 for the data (duplicate data) for which the matching is detected in S1903. Subsequently, S1908 is performed.

S1905: The command processing program 401 inquires of the data arrangement management program 403 about the address as the storage destination in the storage medium 106 connected to the storage medium node 102 of the Write data received in S1901. Subsequently, S1906 is performed.

S1906: The data arrangement management program 403 determines the address of the storage area as the storage destination of the Write data received in S1901 from the page managed by the own controller 101, and responds to the command processing program 401 while referring to the reverse lookup table 502 and the used page table 503. Subsequently, S1907 is performed.

S1907: The command processing program 401 notifies the I/O control program 402 of the information of the storage medium 106 and the address determined in S1906, and instructs the Write access. The I/O control program 402 performs the Write access to the address of the storage medium 106 instructed via the communication I/F 203, and stores the Write data read out from the buffer area 302. The command processing program 401 registers the metadata for the duplication determination generated in S1902 together with the information of the address of the storage medium 106 determined in S1906 in the duplication determination metadata table 1806. Subsequently, S1908 is performed.

S1908: The data arrangement management program 403 adds the LU and the information of the address in the LU to the entry corresponding to the stored data of the reverse lookup table 502 such that the data of which the matching is detected in S1903 or the data stored in S1907 corresponds to the LU of the Write request destination of the host 105 and the address in the LU. Subsequently, S1909 is performed.

S1909: The data arrangement management program 403 specifies the address of the storage destination in the storage medium 106 connected to the storage medium node 102 in which the data before update of the storage area in which the Write request is issued from the host 105 is stored while referring to the mapping table 501. The data arrangement management program 403 specifies whether the controller 101 that manages the page including the storage area of the address is the own controller 101 while referring to the mapping table 501 and the used page table 503. Subsequently, S1910 is performed.

S1910: The data arrangement management program 403 determines whether or not the own controller 101 manages the page including the storage area of the address specified in S1909. When the own controller 101 manages the page including the data before update, the data arrangement management program 403 shifts the processing to S1911. When the own controller 101 does not manage the page including the data before update, the data arrangement management program 403 shifts the processing to S1914.

S1911: The data arrangement management program 403 cancels the association by deleting the LU of the Write request destination of the host 105 and the address in the LU from the entry of the reverse lookup table 502 corresponding to the address specified in S1909. Subsequently, S1912 is performed.

S1912: The data arrangement management program 403 determines whether or not all the LUs and the addresses in the LUs are deleted and the data of the corresponding storage area is in the invalid state for the entry from which the LU of the Write request destination and the address in the LU are deleted in S1911. When the data of the storage area is in the invalid state, the data arrangement management program 403 shifts the processing to S1913. When the data of the storage area is not in the invalid state, the data arrangement management program 403 shifts the processing to S1915.

S1913: The data arrangement management program 403 deletes the entry corresponding to the address specified in S1909 from the duplication determination metadata table 1806. Subsequently, S1915 is performed.

S1914: The data arrangement management program 403 stores the combination of the address specified in S1909, the controller 101 that manages the page corresponding to the address, the LU of the Write request destination of the host 105 and the addresses in the LU in the invalid area table 504. Subsequently, S1915 is performed.

S1915: The data arrangement management program 403 updates the entry of the mapping table 501 corresponding to the LU of the Write request destination of the host 105 and the address in the LU with the address specified in S1904 or the address determined in S1906. Subsequently, S1916 is performed.

S1916: The command processing program 401 notifies the host 105 of the completion of the Write request via the host I/F 204, and ends the series of operations.

The determination of the duplicate data in S1903 may be performed by comparing whether or not the data directly match each other instead of the metadata.

Figure 20A:
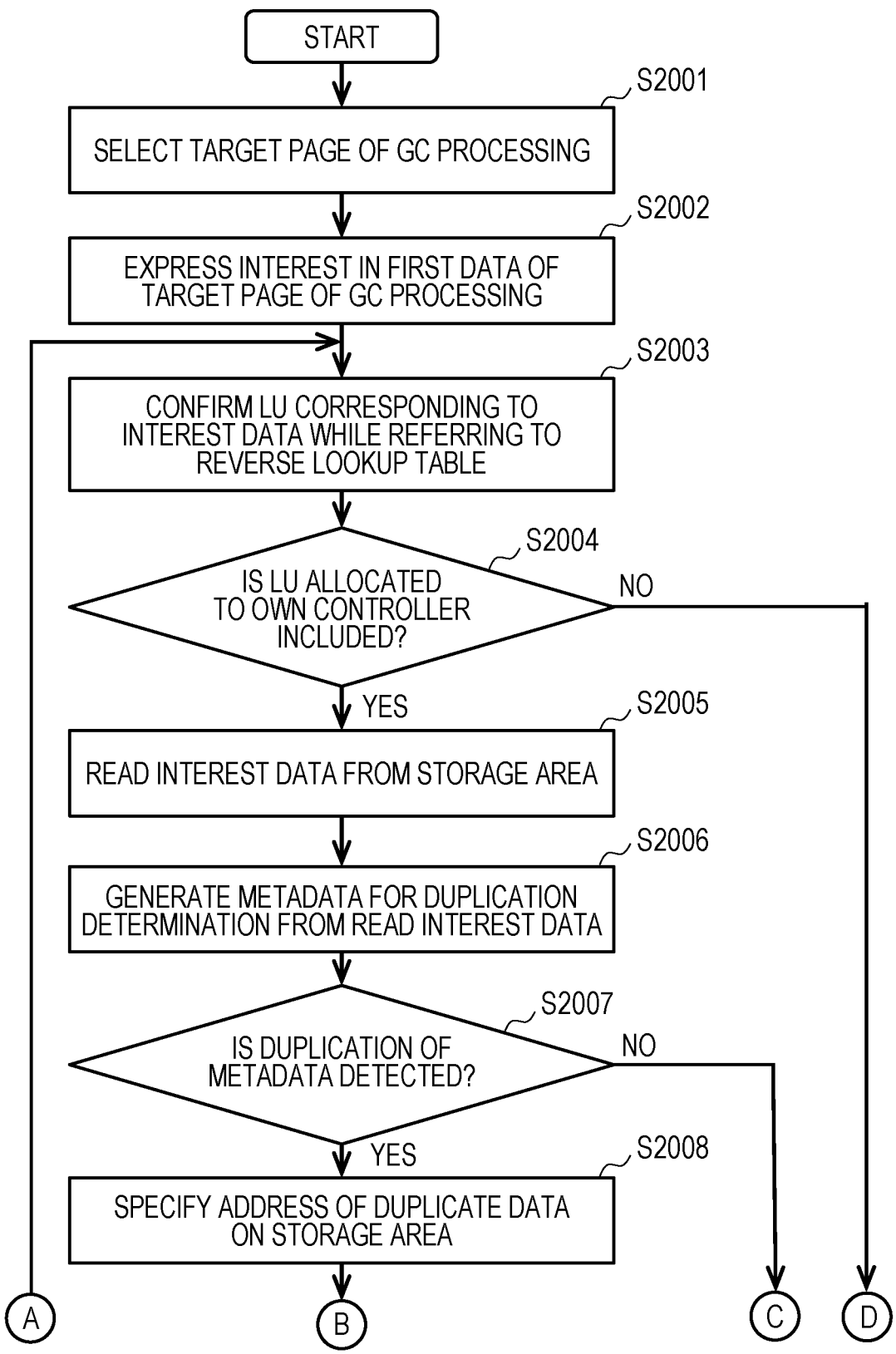
FIG. 20A is a diagram illustrating an example of a flowchart according to the third embodiment.
Figure 20B:
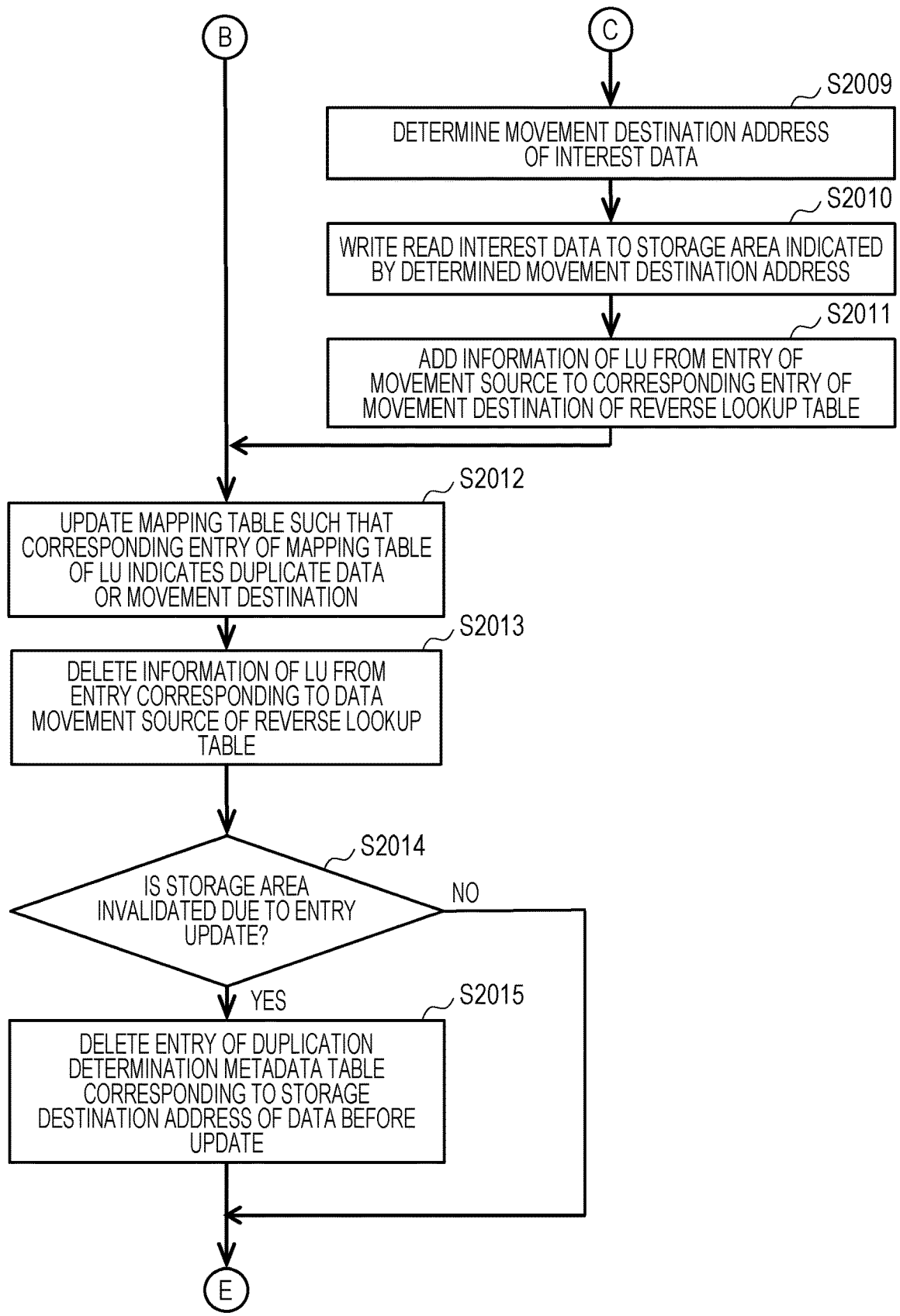
FIG. 20B is a diagram illustrating an example of a flowchart according to the third embodiment.
Figure 20C:
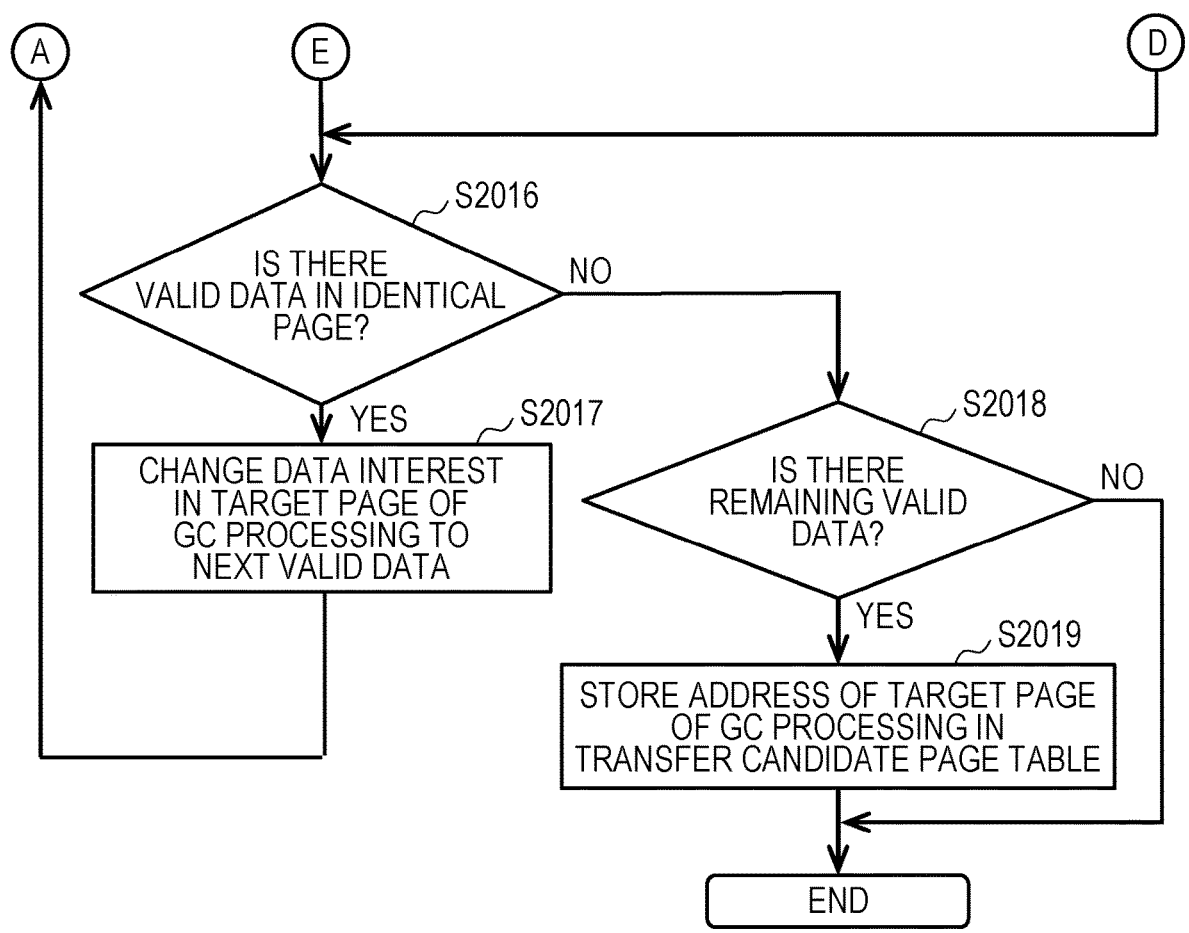
FIG. 20C is a diagram illustrating an example of a flowchart according to the third embodiment.

FIGS. 20A, 20B, and 20C are flowcharts illustrating a series of flows for performing the GC processing related to the pages constituted by the storage media 106 connected to the storage medium node 102 in the controllers 101a and 101b in the present embodiment. Operations based on the flowcharts of FIGS. 20A, 20B, and 20C are as follows.

S2001: The GC target selection program 404 selects the page as the target of the GC processing from the pages registered in the used page table 503 stored in the metadata area 303 at any time, and instructs the GC program 405 to perform the processing. Subsequently, S2002 is performed.

S2002: The GC program 405 uses, as an interest target in the subsequent processing, the first data of the valid data associated with the addresses of one or more LUs in the reverse lookup table 502 stored in the metadata area 303, which corresponds to the page selected in S2001. The valid data of interest in S2002 or S2017 is described as the interest data. Subsequently, S2003 is performed.

S2003: The GC program 405 confirms each LU corresponding to the interest data while referring to the corresponding entry of the reverse lookup table 502 stored in the metadata area 303 for the interest data. Subsequently, S2004 is performed.

S2004: The GC program 405 determines whether or not the access processing is allocated to the own controller 101 for each LU confirmed in S2003. When the LU for which the access processing is allocated to the own controller 101 is included, the GC program 405 shifts the processing to S2005. When the LU for which the access processing is allocated to the own controller 101 is not included, the GC program 405 shifts the processing to S2016.

S2005: The GC program 405 designates the address of the interest data, and instructs the I/O control program 402 to perform the Read access. The I/O control program 402 performs the Read access to the interest data stored in the storage area of the storage medium 106 indicated by the instructed address, and stores the data of the Read result in the buffer area 302 of the memory 202. Subsequently, S2006 is performed.

S2006: The duplication determination metadata generation program 1712 reads out the data of the Read result from the buffer area 302 and generates the metadata for the duplication determination. Subsequently, S2007 is performed.

S2007: The duplication determination program 1713 determines whether or not there is another data matching the data read in S2005 (whether or not the duplication of the metadata is detected) by using the duplication determination metadata table 1806 and the metadata for the duplication determination generated in S2006. When the duplication of the metadata is detected, the duplication determination program 1713 shifts the processing to S2008. When the duplication of the metadata is not detected, the duplication determination program 1713 shifts the processing to S2009.

S2008: The duplication determination program 1713 specifies the address of the storage destination in the storage medium 106 connected to the storage medium node 102 for the data for which the matching is detected in S2007. Subsequently, S2012 is performed.

S2009: The data arrangement management program 403 determines the address on the storage area constituted by the storage medium 106 connected to the storage medium node 102 as the movement destination of the interest data from the page other than the target of the GC processing managed by the own controller 101 while referring to the reverse lookup table 502 and the used page table 503. Subsequently, S2010 is performed.

S2010: The GC program 405 designates the address determined in S2009, and instructs the I/O control program 402 to perform the Write access to the data read in S2005. The I/O control program 402 performs the Write access to the storage area of the storage medium 106 indicated by the designated address via the communication I/F 203, and stores data read out from the buffer area 302. Subsequently, S2011 is performed.

S2011: The data arrangement management program 403 selects only information corresponding to the LU for which the access processing is allocated to the own controller 101 from the LU and the address information in the LU stored in the entry corresponding to the interest data for the reverse lookup table 502 stored in the metadata area 303. The data arrangement management program 403 adds the selected information to the entry of the reverse lookup table 502 corresponding to the address determined as the movement destination of the data in S2009. Subsequently, S2012 is performed.

S2012: The data arrangement management program 403 updates the mapping table 501 stored in the metadata area 303 such that each entry corresponding to the LU of which the information is selectively copied in S2011 and the address in the LU indicates the address specified as the storage destination of the data matching in S2008 or the address determined as the movement destination of the data in S2009. Subsequently, S2013 is performed.

S2013: The data arrangement management program 403 deletes the LU of which the information is selectively copied in S2011 and the address in the LU from the entry corresponding to the interest data for the reverse lookup table 502 stored in the metadata area 303. Subsequently, S2014 is performed.

S2014: The data arrangement management program 403 determines whether or not all the LUs and the addresses in the LUs are deleted and the data of the corresponding storage area is in the invalid state for entries of which the LU and the address in the LU are deleted in S2013. When the data of the storage area is in the invalid state, the data arrangement management program 403 shifts the processing to S2015. When the data of the storage area is not in the invalid state, the data arrangement management program 403 shifts the processing to S2016.

S2015: The data arrangement management program 403 deletes the entry corresponding to the address of the storage area from the duplication determination metadata table 1806 for the address of the storage area corresponding to the entry of which the LU and the address in the LU are deleted in S2013. Subsequently, S2016 is performed.

S2016: The GC program 405 determines whether or not there is the next valid data of the interest data in the identical page. When there is the valid data in the identical page, the GC program 405 shifts the processing to S2017. When there is no valid data in the identical page, the GC program 405 shifts the processing to S2018.

S2017: The GC program 405 changes the interest data in the page as the target of the GC processing to the next valid data. Subsequently, S2003 is performed.

S2018: The GC program 405 determines whether or not there is the remaining valid data in the page as the target of the GC processing. When there is the remaining valid data in the page as the target of the GC processing, the GC program 405 shifts the processing to S2019. When there is no remaining valid data in the page as the target of the GC processing, the GC program 405 ends the series of operations.

S2019: The GC program 405 stores the address of the page as the target of the GC processing in the transfer candidate page table 505, and ends the series of operations.

In the present embodiment, S1003, S1004, and S1005 in the flowchart illustrated in FIG. 10 are the following operations.

S1003: The invalid data notification program 410 of the controller 101a reads out the address in the storage medium 106 connected to the storage medium node 102 of the storage area in which the invalid data is stored and the LU of which the association is canceled and the information of the address in the LU which are included in the page managed by the controller 101b to be notified of the invalid data while referring to the invalid area table 504 (FIG. 18) stored in the metadata area 303 of the controller 101a. Subsequently, S1004 is performed.

S1004: The invalid data notification program 410 of the controller 101a notifies the controller 101b to be notified of the invalid data of the address read out in S1003 and the LU and the information of the address in the LU of which the association is canceled via the communication I/F 203. Subsequently, S1005 is performed.

S1005: The area invalidation program 411 of the controller 101b deletes the LU and the address in the LU simultaneously notified for the entry of the reverse lookup table 502 corresponding to the address in the storage medium 106 connected to the storage medium node 102 notified from the controller 101a. The area invalidation program 411 of the controller 101b deletes the entry corresponding to the address of the storage area from the duplication determination metadata table 1806 for the address of the storage area corresponding to the entry when all the LUs and the addresses in the LUs are deleted for the entry in which the LU and the address in the LU are deleted and the data in the corresponding storage area is in the invalid state, and ends the series of operations.

According to the present embodiment, in the storage system 100 in which the plurality of controllers 101 shares the storage area, the load distribution is achieved between the controllers 101 by moving the access processing and the storage area management while achieving the deduplication function in each controller 101. Accordingly, a state in which the dependency between the controllers 101 is reduced can be maintained.

The present invention is not limited to the above embodiments, and includes various derivative forms. For example, although the functions of the controllers 101a and 101b are software that operates by the processor 201 and the functions of the management node 103 are software that operates by the processor 601 in the first, second, and third embodiments, some or all of the functions may be implemented as hardware. Although the controllers 101a and 101b, the storage medium node 102, and the management node 103 are connected by the network 104 in the first, second, and third embodiments, these components may be connected via a bus, a backplane, or the like in the identical housing and the identical hardware.

Although the mapping table 501 of the controller 101a or 101b is stored in the buffer area 302 of the memory 202 in the first, second, and third embodiments, some or all thereof may be stored in the storage area constituted by the storage medium 106 connected to the storage medium node 102. At this time, in moving the authority for the access processing, the address of the storage destination of the storage area may be copied between the controllers 101 instead of the information in the mapping table 501. Similarly, in the first, second, and third embodiments, some or all of the reverse lookup table 502 of the controller 101a or 101b may be stored in the storage area constituted by the storage medium 106 connected to the storage medium node 102. At this time, in transferring the GC processing between the controllers 101, the address of the storage destination of the storage area 101 may be copied between the controllers 101 instead of the information of the reverse lookup table 502.

(4) Appendix

The above embodiments include, for example, the following contents.

Although it has been described in the above-described embodiments that the present invention is applied to the storage system, the present invention is not limited thereto, and can be widely applied to various other systems, devices, methods, and programs.

In the above-described embodiments, the configuration of each table is an example, one table may be divided into two or more tables, or all or a part of the two or more tables may be one table.

Although various kinds data have been described by using the XX table in the above-described embodiments for the sake of convenience in description, the data structure is not limited and may be expressed as XX information or the like.

Information of programs, tables, and files for achieving the functions can be stored in a storage device such as a memory, a hard disk, or a SSD, or a recording medium such as an IC card, an SD card, or a DVD.

The above-described embodiments include, for example, the following characteristic configurations.

A storage system (for example, storage system 100) includes one or more storage media (for example, storage media 106) and a plurality of controllers (for example, controllers 101) that provides a storage function to a host (for example, host 105) and in which the plurality of controllers shares a storage area (for example, virtual storage area, physical storage area) of the storage medium. The storage area (for example, page) in which data is written and data is relocated is allocated to each controller (for example, see used page table 503). Each controller moves authority for access processing to data in a logical area (for example, LU) allocated to the controller between the controllers (for example, see FIG. 9). For a first storage area in which there is data related to the logical areas of the plurality of controllers by moving the authority for the access processing from a first controller (for example, controller 101a) to a second controller (for example, controller 101b), each of the first controller and the second controller writes data after update related to a Write request to the storage area allocated to the own controller (for example, see FIG. 8) and deletes data before update in the first storage area, and moves data for which the own controller has the authority for the access processing in the first storage area to another storage area allocated to the own controller while taking over the allocation of the first storage area in relocation processing of relocating data (for example, GC processing) (for example, see FIG. 12).

In the above configuration, the data for which the own controller has the authority for the access processing in the first storage area is moved to another storage area allocated to the own controller while taking over the allocation of the first storage area. Thus, in the movement of the authority for the access processing between the controllers, it is possible to reduce the processing dependence between the controllers even when the data as the target of each access processing is mixed in the storage area. As a result, it is possible to improve performance by adding a controller in the storage system and improve usage efficiency of controller resources.

When there is no valid data in the storage area, each of the first controller and the second controller releases the allocation of the storage area (see, for example, FIG. 15).

In the relocation processing, after the first controller to which the first storage area is allocated moves the data for which the own controller has the authority for the access processing to the storage area allocated to the own controller, the allocation of the first storage area is taken over by the second controller, and the second controller moves the data for which the own controller has the authority for the access processing to the storage area allocated to the own controller (see, for example, FIG. 12).

Each of the first controller and the second controller is able to read data of a storage area which is not allocated to the storage area, and when a Read request of data for which the own controller has the authority for the access processing in the first storage area is received before the takeover of the allocation, the second controller reads out the data from the first storage area and transmits the data (see, for example, FIG. 7).

In the relocation processing, the data is relocated at a predetermined timing in the identical storage area before the authority for the access processing is moved between the controllers, and after the authority for the access processing is moved between the controllers, data is relocated to another storage area.

A size of the storage area allocated to each controller is a predetermined size, and each controller performs allocation and release of an area in which the own controller writes data and relocates data with the predetermined size according to an increase and a decrease in a capacity involved in the storing of the data (see, for example, FIGS. 15 and 16).

In the above configuration, since the storage area is allocated and released according to the increase or decrease in the capacity involved in the storing of the data, it is possible to eliminate the insufficiency and bias of the storage area allocated to each controller. Since the unit of the storage area in which the relocation processing is performed and the unit of the storage area in which the allocation and the release are performed match, it is possible to perform the release and reallocation for the storage area in which the authority is moved due to the takeover of the relocation processing similarly to another storage area.

In the relocation processing, each controller confirms duplication of data as a movement target to be moved from the storage area with another data, and deletes the data as the movement target from the storage area without moving the data as the movement target when the duplicate data is present and is invalid (see, for example, FIGS. 20A, 20B, and 20C).

In the above configuration, the deduplication of the data is performed in each controller, a load distribution between the controllers is achieved, and a state in which the processing dependence between the controllers is reduced is maintained.

When authority for writing and relocation for the first storage area is allocated to the first controller, the second controller stores invalidation information for invalidating the data before update in the first storage area in response to the Write request, and notifies the first controller of the invalidation information asynchronously with the Write request (see, for example, S1001).

In the above configuration, since the invalidation information is notified to the second controller asynchronously with the access processing, it is possible to avoid the influence of the overhead of the communication, for example.

Each controller performs the takeover asynchronously with the movement of the data in the relocation processing (see, for example, FIG. 12).

In the above configuration, since the movement and the takeover of the relocation processing are asynchronously performed, for example, the influence of the overhead of the communication can be avoided.

The configurations described above may be appropriately changed, rearranged, combined, or omitted without departing from the scope of the present invention.

It should be understood that the items in the list in the form "at least one of A, B, and C" can mean (A), (B), (C), (A and B), (A and C), (B and C), or (A, B, and C). Similarly, the items listed in the form "at least one of A, B, or C" can mean (A), (B), (C), (A and B), (A and C), (B and C), or (A, B, and C).

What is claimed is:

1. A storage system, comprising:
   one or more storage media and a plurality of controllers that provides a storage function to a host and in which the plurality of controllers shares a storage area of the storage medium,
   wherein the storage area in which data is written and data is relocated is allocated to each controller,
   wherein the plurality of controllers include a first controller and a second controller, the first controller requests that the second controller takes over authority for access processing of data in a logical area allocated to the first controller, and the second controller takes over authority for access processing of the data in the logical area allocated to the first controller,
   wherein for a first storage area in which there is data related to the logical areas of the first controller and the second controller from the take over of the authority for access processing, each of the first controller and the second controller writes update data, which is data after an update, related to a Write request to the storage areas respectively allocated to the first controller and the second controller and deletes pre-update data, which is data before the update in the first storage area, and
   wherein the second controller moves data for which the second controller has the authority for the access processing in the first storage area to another storage area allocated to the second controller while taking over the allocation of the first storage area in a relocation processing of relocating data.

2. The storage system according to claim 1, wherein when there is no valid data in the storage area, the allocation of the storage area is released.

3. The storage system according to claim 1, wherein in the relocation processing, after the first controller to which the first storage area is allocated moves the data for which the second controller has the authority for the access processing to the storage area allocated to the second controller, the allocation of the first storage area is taken over by the second controller, and the second controller moves the data for which the second controller has the authority for the access processing to the storage area allocated to the second controller.

4. The storage system according to claim 3, wherein each of the first controller and the second controller is able to read data of a storage area which is not allocated to the storage area, and
   when a Read request of data for which the first controller or the second controller itself has the authority for the access processing in the first storage area is received before the takeover of the allocation, the second controller reads out the data from the first storage area and transmits the data.

5. The storage system according to claim 1, wherein in the relocation processing, the data is relocated at a predetermined timing in the identical storage area before the authority for the access processing is moved between the controllers, and after the authority for the access processing is moved between the controllers, data is relocated to another storage area.

6. The storage system according to claim 1, wherein
a size of the storage area allocated to each controller is a predetermined size, and
each controller performs allocation and release of an area in which the first controller or the second controller itself writes data and relocates data with the predetermined size according to an increase and a decrease in a capacity involved in the storing of the data.

7. The storage system according to claim 1, wherein
in the relocation processing, each controller confirms duplication of data as a movement target to be moved from the storage area with another data, and deletes the data as the movement target from the storage area without moving the data as the movement target when the duplicate data is present and is invalid.

8. The storage system according to claim 1, wherein
when authority for writing and relocation for the first storage area is allocated to the first controller, the second controller stores invalidation information for invalidating the data before update in the first storage area in response to the Write request, and notifies the first controller of the invalidation information asynchronously with the Write request.

9. The storage system according to claim 1, wherein
each controller performs the takeover asynchronously with the movement of the data in the relocation processing.

10. A data management method in a storage system that includes one or more storage media and a plurality of controllers, including a first controller and a second controller, which provides a storage function to a host and in which the plurality of controllers shares a storage area of the storage medium, the method comprising:

allocating the storage area in which data is written and data is relocated to each controller;

requesting, by the first controller, that the second controller takes over authority for access processing of data in a logical area allocated to the first and the second controller takes over authority for access processing of the data in the logical area allocated to the first controller;

wherein for a first storage area in which there is data related to the logical areas of the first controller and the second controller from the take over of the authority for access processing each of the first controller and the second controller writes update data, which is data after an update, related to a Write request to the storage areas respectively allocated to the first controller and the second controller, and deleting pre-update data, which is data before the update in the first storage area; and moving, by the second controller, data for which the second controller has the authority for the access processing in the first storage area to another storage area allocated to the second controller while taking over the allocation of the first storage area in a relocation processing of relocating data.

* * * * *